United States Patent
Wakizaka

(10) Patent No.: US 12,060,234 B2
(45) Date of Patent: Aug. 13, 2024

(54) TRANSPORTING SYSTEM

(71) Applicant: MURATA MACHINERY, LTD., Kyoto (JP)

(72) Inventor: Michinobu Wakizaka, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 468 days.

(21) Appl. No.: 17/424,516

(22) PCT Filed: Dec. 3, 2019

(86) PCT No.: PCT/JP2019/047227
§ 371 (c)(1),
(2) Date: Jul. 21, 2021

(87) PCT Pub. No.: WO2020/170547
PCT Pub. Date: Aug. 27, 2020

(65) Prior Publication Data
US 2022/0089385 A1     Mar. 24, 2022

(30) Foreign Application Priority Data
Feb. 19, 2019  (JP) ................................ 2019-027502

(51) Int. Cl.
*B65G 57/30*  (2006.01)
*B65G 43/08*  (2006.01)
(Continued)

(52) U.S. Cl.
CPC ........... *B65G 57/303* (2013.01); *B65G 43/08* (2013.01); *B65G 47/643* (2013.01);
(Continued)

(58) Field of Classification Search
CPC .............. B65G 47/643; B65G 47/8853; B65G 2201/0273
See application file for complete search history.

(56) References Cited

U.S. PATENT DOCUMENTS 2,069,926 A * 2/1937 Read .................. B65B 21/025
                                                              53/529
2,277,688 A * 3/1942 Cattonar ................ B65B 21/18
                                                              53/248
(Continued)

FOREIGN PATENT DOCUMENTS

CN     201012864 Y  *  1/2008
CN     201012864 Y     1/2008
(Continued)

OTHER PUBLICATIONS

Official Communication issued in corresponding European Patent Application No. 19916339.5, dated Oct. 25, 1 2022.
(Continued)

*Primary Examiner* — Lucas E. A. Palmer
(74) *Attorney, Agent, or Firm* — Keating & Bennett, LLP

(57) ABSTRACT

In a transporting system, a first conveyor includes a transport surface to transport different size tires in a first direction. A first positioner positions an end of a tire transported by the first conveyor, at a first predetermined position in the first direction. A second positioner positions an end of the tire at a second predetermined position in a second direction horizontally perpendicular or substantially perpendicular to the first direction. The first and second clamping portion portions are at or adjacent to a clamping position, and pass through between a tire first portion at or adjacent to an end of the tire positioned by the first positioner and a tire second portion at or adjacent to an end of the tire positioned by the second positioner to clamp side surfaces of the tire.

23 Claims, 24 Drawing Sheets

(51) Int. Cl.
  *B65G 47/64*   (2006.01)
  *B65G 47/88*   (2006.01)
  *B65G 47/90*   (2006.01)

(52) U.S. Cl.
  CPC ....... *B65G 47/8853* (2013.01); *B65G 47/901* (2013.01); *B65G 2201/0273* (2013.01); *B65G 2203/0233* (2013.01); *B65G 2203/042* (2013.01); *B65G 2814/0307* (2013.01)

(56) References Cited

U.S. PATENT DOCUMENTS

| | | | | |
|---|---|---|---|---|
| 3,225,890 A * | 12/1965 | Wiese | B21C 47/24 | 198/456 |
| 3,627,149 A * | 12/1971 | Arnemann | B65G 60/00 | 414/792.5 |
| 3,642,117 A * | 2/1972 | Burt | B65G 13/00 | 209/583 |
| 3,647,051 A * | 3/1972 | Didas | B65G 21/2072 | 198/836.3 |
| 3,655,069 A * | 4/1972 | Gertsen | B65G 47/57 | 414/609 |
| 3,679,076 A * | 7/1972 | Miller | B65G 49/068 | 414/730 |
| 3,788,497 A * | 1/1974 | Carlson | B65G 57/32 | 414/791.7 |
| 3,978,970 A * | 9/1976 | Reimers | A23L 3/045 | 414/789.5 |
| 4,000,922 A * | 1/1977 | Wade | B65G 7/12 | 294/16 |
| 4,156,482 A * | 5/1979 | Tomlinson | B65G 57/28 | 414/798.2 |
| 4,197,046 A * | 4/1980 | Shank | B65G 65/00 | 414/789.8 |
| 4,302,919 A * | 12/1981 | Hartness | B65G 47/22 | 53/539 |
| 4,354,786 A * | 10/1982 | Spitler | B65G 57/302 | 414/792.6 |
| 4,493,599 A * | 1/1985 | Hartness | B65G 59/005 | 414/796.2 |
| 4,540,325 A * | 9/1985 | Heisler | B65G 57/302 | 414/788.9 |
| 4,633,581 A * | 1/1987 | Villanueva | B65G 61/00 | 414/791.3 |
| 4,633,784 A * | 1/1987 | Hoehn | B65G 33/04 | 104/162 |
| 4,638,756 A * | 1/1987 | Collmann | B65G 47/8823 | 118/232 |
| 4,648,646 A * | 3/1987 | Klupfel | B65G 47/90 | 294/106 |
| 4,667,808 A * | 5/1987 | Mastak | B65G 57/245 | 198/429 |
| 4,685,551 A * | 8/1987 | Ono | B65G 47/22 | 198/346.2 |
| 4,729,709 A * | 3/1988 | Raasch | B65H 67/065 | 414/908 |
| 4,741,429 A * | 5/1988 | Hattori | B65G 47/22 | 198/456 |
| 4,955,782 A * | 9/1990 | D'agnolo | B65H 67/064 | 414/789.5 |
| 5,139,388 A * | 8/1992 | Martin | B65G 57/245 | 414/922 |
| 5,207,311 A * | 5/1993 | Terai | B65G 47/74 | 53/448 |
| 5,263,813 A * | 11/1993 | Kiederle | B65G 61/00 | 414/908 |
| 5,271,709 A * | 12/1993 | VanderMeer | B65G 47/088 | 414/791.7 |
| 5,399,062 A * | 3/1995 | Grabovszky | B65G 47/22 | 198/429 |
| 5,415,520 A * | 5/1995 | Seiver | B65G 47/088 | 414/799 |
| 7,937,913 B2 * | 5/2011 | Schill | G01G 15/001 | 53/502 |
| 2004/0129532 A1 * | 7/2004 | Lehmann | B65G 47/22 | 198/416 |
| 2009/0314608 A1 * | 12/2009 | Rogers | B65G 47/8823 | 198/367 |
| 2012/0006650 A1 * | 1/2012 | Ouellette | B65G 47/22 | 198/416 |
| 2012/0146350 A1 * | 6/2012 | Weber | B65G 47/90 | 294/81.54 |
| 2012/0181145 A1 * | 7/2012 | Rogers | B65G 47/8861 | 198/367.1 |
| 2013/0233066 A1 * | 9/2013 | Wakazono | G01M 17/021 | 73/146 |
| 2016/0252431 A1 * | 9/2016 | Tachibana | G01M 17/021 | 73/146 |
| 2017/0267469 A1 * | 9/2017 | Miyoshi | B65G 43/00 | |
| 2019/0202069 A1 * | 7/2019 | Bando | B65G 47/082 | |
| 2022/0089385 A1 * | 3/2022 | Wakizaka | B65G 57/303 | |
| 2022/0234317 A1 * | 7/2022 | Bijl | B25J 15/0052 | |
| 2023/0109072 A1 * | 4/2023 | Suzuki | B65G 57/03 | 414/788.1 |

FOREIGN PATENT DOCUMENTS

| | | | |
|---|---|---|---|
| CN | 207903526 U | | 9/2018 |
| JP | 58-022219 A | | 2/1983 |
| JP | 58022219 A | * | 2/1983 |
| JP | 61-33429 A | | 2/1986 |
| JP | 04-060896 B2 | | 9/1992 |
| JP | 05-026926 U | | 4/1993 |
| JP | 07-002530 B2 | | 1/1995 |
| JP | 11-49353 A | | 2/1999 |
| JP | 2002-002950 A | | 1/2002 |
| JP | 2012-127794 A | | 7/2012 |
| KR | 20060001220 A | * | 1/2006 |
| KR | 20080105754 A | * | 12/2008 |

OTHER PUBLICATIONS

Official Communication issued in International Patent Application No. PCT/JP2019/047227, dated Aug. 10, 2021.
English translation of Official Communication issued in International Patent Application No. PCT/JP2019/047227, dated Feb. 10, 2020.
Official Communication issued in International Patent Application No. PCT/JP2019/047227, dated Feb. 10, 2020.
Official Communication issued in corresponding European Patent Application No. 19916339.5, dated Jan. 30, 2024.

* cited by examiner

TRANSPORTING SYSTEM

BACKGROUND OF THE INVENTION

1. Field of the Invention

The present invention relates to a transporting system, especially to a transporting system that transports plural kinds of circular articles having different sizes.

2. Description of the Related Art

Conventionally, a tire stacking apparatus has been known that stacks tires (Refer to Japanese Examined Patent Application Publication H07-2530, for example).

The tire stacking device described in Japanese Examined Patent Application Publication H07-2530 includes a transportation means having a transport surface, a centering means for centering tires, a holding means for holding the tires, and a lifting means for lifting the holding means.

SUMMARY OF THE INVENTION

Subjects to be stacked by the tire stacking apparatus in Japanese Examined Patent Application Publication H07-2530 are tires having the same rim diameter (inner diameter).

Accordingly, Japanese Examined Patent Application Publication H07-2530 does not disclose technologies able to center and stack tires having different rim diameters.

Preferred embodiments of the present invention are capable of precisely and securely clamping circular articles with various sizes in a transporting system.

Aspects of preferred embodiments of the present invention are explained below. These aspects can be arbitrarily combined as needed.

A transporting system according to one aspect of a preferred embodiment of the present invention includes a conveyor, a controller, a first positioner, a second positioner, and a pair of clamping portions.

The conveyor includes a transport surface to transport multiple kinds of circular articles having different sizes, in a first direction.

The controller is configured or programmed to control the conveyor to perform transportation.

The first positioner positions an end of an article that is transported by the conveyor, at a first predetermined position in the first direction.

The second positioner positions an end of the article in a second predetermined position horizontally in a second direction perpendicular or substantially perpendicular to the first direction.

The pair of clamping portions is provided at a clamping position and passes through between an article first portion at or adjacent to an end of the article that has been positioned by the first positioner and an article second portion at or adjacent to an end of the article that has been positioned by the second positioner to clamp side surfaces of the article.

In the transporting system, one end of the article is positioned at the first predetermined position in the first direction, and one end of the article is positioned at the second predetermined position in the second direction. A portion of the article is then clamped which is between the article the first portion and the article the second portion by the pair of clamping portions. Accordingly, articles having different outer diameters can be clamped accurately.

"One end of the article" means one portion of the outer periphery of the circular article.

The first positioner and the second positioner are located adjacent to each other on the conveyor, or spaced away from each other on the conveyor in the transport direction. In addition, the first positioner and the second positioner may include stoppers, one of which makes contact and escapes contact, or both of the first and second positioners may be stoppers. Furthermore, the first positioner and the second positioner may be conveyors, only one of which is a conveyor that moves an article, or both of the first and second positioners may include conveyors that move an article.

The pair of clamping portions may clamp the article in a direction inclined relative to the first direction.

In the transporting system, even articles having different outer diameters are clamped accurately and securely.

The pair of clamping portions may clamp the article at a middle of a straight line connecting the article first portion and the article second portion, along in a third direction horizontally perpendicular or substantially perpendicular to the straight line.

In the transporting system, since the clamping direction matches the center of article, even articles having different outer diameters are clamped accurately.

The transporting system may further include a shifter in the conveyor, upstream of the first positioner in a transport direction, to shift the article to one side in the second direction.

The first positioner may extend in the second direction.

The second positioner may be disposed on one side of the conveyor in the second direction, and the second positioner protrudes from the transport surface of the conveyor in the vertical direction.

The pair of clamping portions may pass through between the article first portion and the article second portion to clamp the article in a direction at an angle of about 45 degrees relative to the first direction.

In the transporting system, the article is shifted to one side in the second direction by the shifter, and is then positioned in the second direction by the second positioner. After that, the article is, downstream in the transport direction, positioned in the first direction by the first positioner. The pair of clamping portions move obliquely at an angle of about 45 degrees relative to the first direction, i.e., the transport direction. Accordingly, the first positioner and the pair of clamping portions can be made compact.

The shifter includes, for example, a direction changer, a conveyor having an oblique transport direction, or a pusher that pushes an article.

The first positioner may be movable between a first position where the first positioner projects above from the transport surface and a second position farther away from the article than the first position is, downstream in the transport direction or the first direction.

In the transporting system, the first positioner moves from the first position to the second position after the contact with an article. At this time, since the second position is spaced away from the article in the first direction farther than the first position is, it is unlikely that a load is applied from the first positioner to the article. Accordingly, a position or an orientation of the article is unlikely to change. The reason to avoid the change in orientation of the article is that it is desirable not to change the position of the barcode that has been attached to the article in the upstream for example. In other words, if the orientation of the article is not changed, the position of a barcode reader downstream can be fixed.

The second positioner may be movable between a third position where the second positioner can come into contact with the article in the second direction and a fourth position farther away from the article and the transport surface in the second direction than the third position is.

In the transporting system, the second positioner moves, after the contact with the article, from the third position to the fourth position. At this time, since the fourth position is farther away from the article in the second direction than the third position is from the article in the second direction, it is unlikely that load is applied from the second positioner to the article. Accordingly, the position or orientation of an article is unlikely to change.

The first positioner may include a first-direction position detector, which may be disposed at or adjacent to the clamping position to contactlessly detect an end of the article in the first direction.

The controller may be configured or programmed to control the conveyor to stop transportation after the first-direction position detector detects the end of the article.

The second positioner may position an end of the article on a side of the conveyor in the second direction.

The pair of clamping portions may pass through the article first portion and the article second portion to clamp the article in a direction at an angle of about 45 degrees relative to the first direction.

In the transporting system, the end of the article is positioned by the second positioner relative to one side in the second direction. If the first-direction end of the article is detected by the first-direction position detector, the conveyor is stopped to position the end of article at the first predetermined position in the first direction. The pair of clamping portions move obliquely at an angle of about 45 degrees relative to the first direction, i.e., the transport direction. Accordingly, the first positioner and the pair of clamping portions can be made compact.

The second positioner may include a second-direction position detector and a second-direction adjustment conveyor.

The second-direction position detector may contactlessly detect a second-direction position of the article.

The second-direction adjustment conveyor may transport the article in the first direction, and being movable in the second direction. The mover moves, based on information from the second-direction position detector, the second-direction adjustment conveyor in the second direction to position the article at a desired position in the second direction.

In the transporting system, the mover moves the second-direction adjustment conveyor in the second direction to position the end of article at the second predetermined position in the second direction. In this case, since the article does not move relative to the second-direction adjustment conveyor, the second-direction position of the article can be determined accurately.

The transporting system may further include an elevator.

The elevator may include a pair of lower bodies located below in the vertical direction, a pair of upper bodies located above in the vertical direction, a pair of connectors connecting the pair of lower bodies and the pair of upper bodies, respectively, and the pair of clamping portions being connected to the pair of connectors, respectively; and a driver to drive the pair of lower bodies or the pair of upper bodies such that the pair of clamping portions moves between the upper position and the lower position. The driver may be one or two for the pair of clamping portions.

The pair of lower bodies may be located at a position higher than an upper surface of the highest article.

The pair of clamping portions may be located in the lower position such that lower ends of the pair of clamping portions are lower than the pair of lower bodies.

In the transporting system, since the pair of lower bodies are located at a position higher than the upper surface of the highest article, even if the pair of lower bodies are positioned above the conveyor, the pair of lower bodies does not hinder the transportation of an article. In addition, since the lower ends of the pair of clamping portions are positioned at a position lower than the pair of lower bodies, the pair of clamping portions can clamp the lowest article among the stacked articles.

The transporting system may further include a detector to detect a height of the article, and a controller configured or programmed to, in response to the height of the article, control driving amounts of the driver.

In the transporting system, since it is possible to reduce or minimize rising amounts of the pair of clamping portions, the operating efficiency is improved.

The transporting system may further include a clamping driver to move the pair of clamping portions in a clamping direction, and a controller configured or programmed to control the clamping driver such that one of the pair of clamping portions moves to a position where the one is in contact with or adjacent to the article, and then the other of the pair of clamping portions pushes the article to clamp the article between the pair of clamping portions.

In the transporting system, since one of the pair of clamping portions first comes into contact with or is adjacent to the article, the motion control of the pair of clamping portion becomes easier.

The second-direction position detector may include an optical axis along the first direction.

The transporting system may further include a detector mover to move the second-direction position detector between a detecting position and an escape position in the second direction.

The escape position may be farther away from the second-direction adjustment conveyor in the second direction than the detecting position is.

The detector mover may locate the second-direction position detector in the escape position when the article is imported into and exported out from the second-direction adjustment conveyor, and locate the second-direction position detector in the detecting position when the article is positioned in the second direction in the second-direction adjustment conveyor.

While the second-direction position detector is being positioned in the detecting position, the mover moves the second-direction adjustment conveyor toward the second-direction position detector, and if the second-direction position detector detects the article, the mover stops the movement of the second-direction adjustment conveyor to position the article in the second direction.

In the transporting system, since the second-direction position detector is located in the escape position when the article is imported into or exported from the second-direction adjustment conveyor, for example, it is unlikely that the second-direction position detector interferes with the tires.

The transporting system may further include convex portions provided in inner lower portions of the pair of clamping portions.

In the transporting system, the convex portions increase the thickness of the lower portions of the pair of clamping portions, so enough clamping force can be applied to the lowest article.

Transporting systems according to preferred embodiments of the present invention, it is possible to accurately clamp circular articles having various sizes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
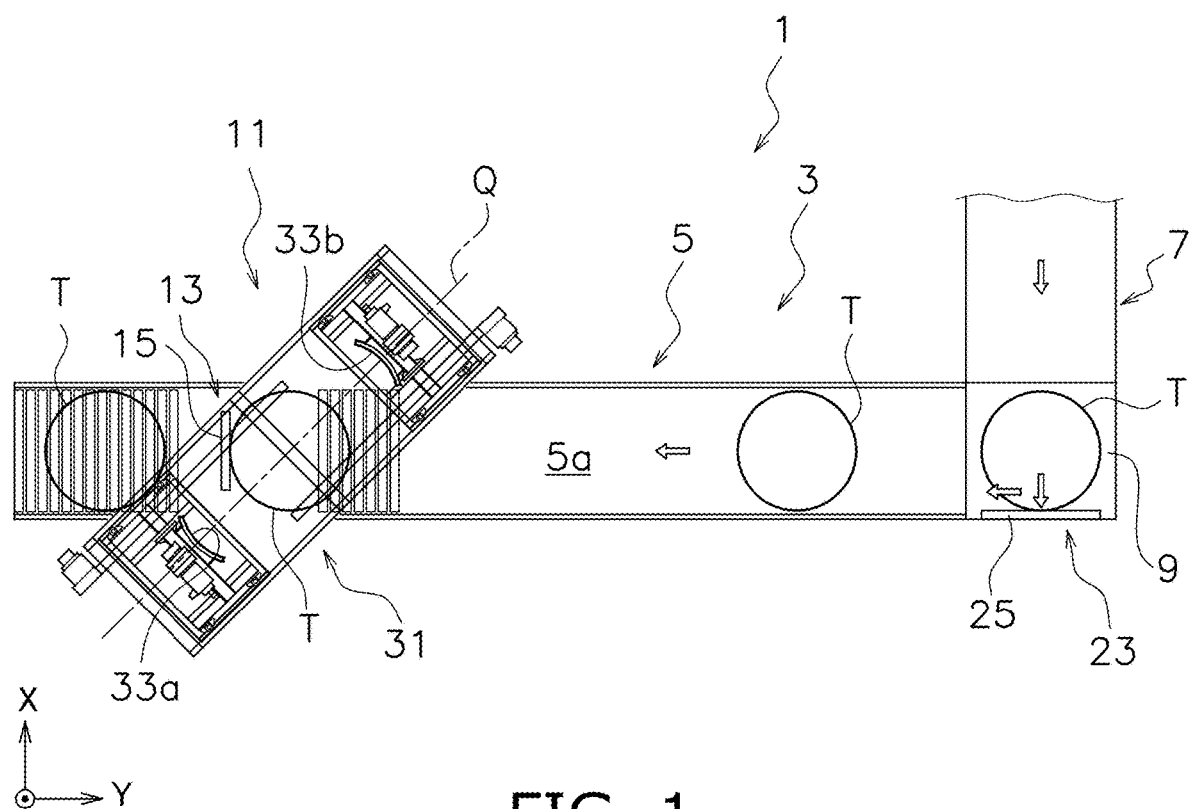
FIG. 1 is a schematic plan view of a transporting system according to a first preferred embodiment of the present invention.

Referring to FIG. 1, a transporting system 1 according to a first preferred embodiment of the present invention will be explained. FIG. 1 is a schematic plan view of a transporting system according to the first preferred embodiment.

The transporting system 1 transports tires T (one example of an article) one by one, stacks multiple tires T, and then transports the stacked tires T.

The transporting system 1 includes a conveyor apparatus 3 to transport the tires T of various types with different sizes.

The conveyor apparatus 3 includes a first conveyor 5, a second conveyor 7, and a direction changing device 9. The direction changing device 9 is located between the first conveyor 5 and the second conveyor 7. The tire T is transported in an order of the second conveyor 7, the direction changing device 9, and the first conveyor 5.

The first conveyor 5 and the second conveyor 7 are perpendicular or substantially perpendicular to each other, and the direction changing device 9 changes transport direction of the tire T from the second conveyor 7 toward the first conveyor 5.

The first conveyor 5 and the second conveyor 7 are well-known technologies (for example, roller conveyors) and include a transport surface 5a to transport the tire T. The direction changing device 9 uses well-known technologies (for example, a roller conveyor and a chain conveyor lifting through the roller conveyor). Members of each apparatus are arbitrarily omitted for simplification of drawings.

Below, a direction in which the first conveyor 5 extends is referred to as the first direction (arrow Y), and a direction in which the second conveyor 7 extends is referred to as the second direction (arrow X).

The transporting system 1 includes a centering and stacking device 11 to stack the tires T while centering them. The stacked tires T are later inserted directly into a rack (not shown) with robot arms (not shown) or other devices. If the tires T have not been accurately centered, the tires may tilt and collapse when the robot arms hold multiple tires T. Therefore, precise centering is required. The centering and stacking device 11 aims to solve the above-described problem (later described).

The centering and stacking device 11 includes a first positioning device 13 (one example of the first positioner) to position one end of the tire T that is transported by the first conveyor 5, in the first predetermined position in the first direction.

The first positioning device 13 includes a first stopper 15. The first stopper 15 is provided in the first conveyor 5. The first stopper 15 can protrude above from a transport surface 5a of the first conveyor 5 to abut with the tire T, being transported by the first conveyor 5, in the first direction. The first stopper 15 extends in the second direction.

Figure 2:
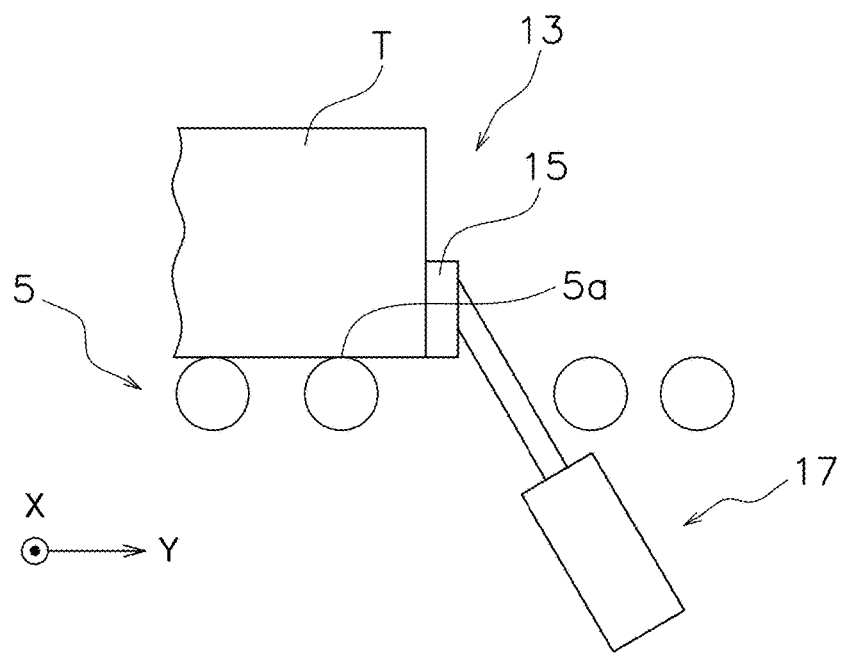
FIG. 2 is a schematic side view of a first positioning device.
Figure 3:
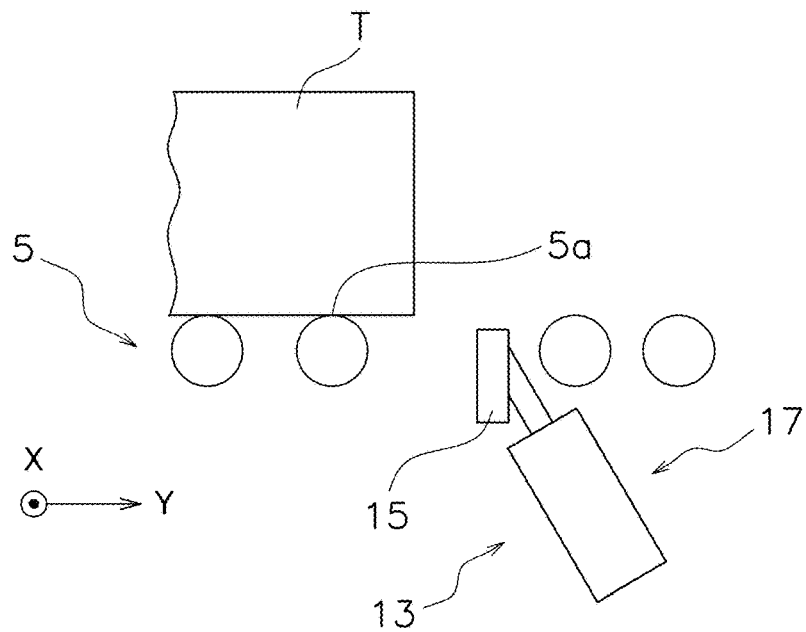
FIG. 3 is a schematic side view of the first positioning device.

Referring to FIG. 2 and FIG. 3, the first positioning device 13 will be described specifically. FIG. 2 and FIG. 3 are schematic side views of the first positioning device.

The first positioning device 13 includes a first stopper-driving portion 17, which moves the first stopper 15 between a contact position where the first stopper 15 protrudes above from the transport surface 5a (FIG. 2, one example of the first position) and an escape potion where the first stopper 15 is positioned obliquely downward away from the contact position and below the transport surface 5a and downstream of the contact portion in the transport direction (FIG. 3, one example of the second position). The first stopper-driving unit 17 includes an air cylinder, for example.

In the transporting system 1, the first stopper 15 moves, after abutting against the tire T, from the contact position to the escape position. At this time, since the escape position is farther away from the tire T than the contact position is, it is unlikely that the first stopper 15 applies load to the tire T. Accordingly, it is unlikely that the position or orientation of the tire T is altered. If it is not necessary to consider rotation or wear of the tire T, the first stopper reciprocates only in the vertical direction.

The centering and stacking device 11 includes a second positioning device 23 (one example of the second positioner) to position an end of the tire T at the second predetermined position in the second direction.

The second positioning device 23 includes a second stopper 25. The second stopper 25 is provided on one side in the second direction (lower side in FIG. 1) in the direction changing device 9. The second stopper 25 can protrude above from the transport surface 5a of the direction changing device 9 to come into contact with one side surface of the tire T.

Figure 10:
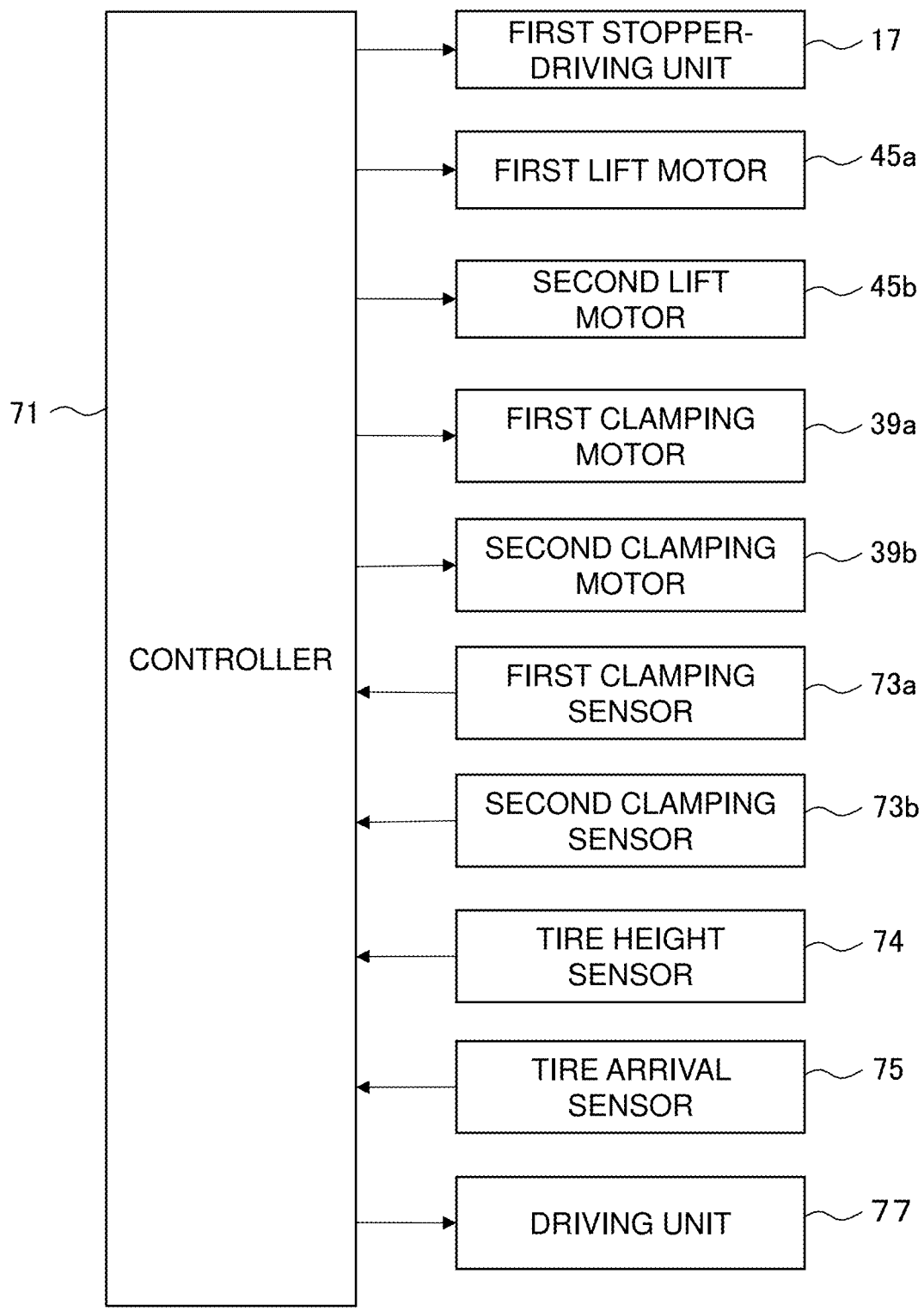
FIG. 10 is a block diagram illustrating the control configuration of the stacking device.

The second positioning device 23 includes a driving unit 77 (FIG. 10). The driving unit 77 moves the second stopper between a contact position where the second stopper 25 protrudes above from the transport surface 5a (one example of the third position) and an escape position away from the tire T farther than the contact position is in the second direction (one example of the fourth position). The driving unit 77 may be the same as the first stopper-driving unit 17 of the first positioning device 13, or may include a structure that escapes the second stopper 25 laterally. If it is not necessary to consider rotation of the tire T, the second stopper 25 need not be capable of escaping contact.

The direction changing device 9 moves, upstream of the first positioning device 13 in the transport direction, the tire T toward one side of the second direction (downward in FIG. 1, and toward the second stopper 2). Accordingly, the tire T comes into contact with the second stopper 25 and is positioned in the second direction.

After that, the second stopper 25 moves from the contact position to the escape position. At this time, since the contact position is farther away from the tire T in the second direction than the escape position is, the second stopper 25 is not likely to apply a load to the tire T. Accordingly, the position or orientation of the tire T is unlikely to be altered.

And after that, the tire T is transported on the first conveyor 5 along the first direction toward the first positioning device 13. At this time, since the first conveyor 5 is not provided with a guide on the back side in the second direction (in the lower side in FIG. 1), the tire T is transported while posture or position of the tire T that has been positioned in the second direction is not altered.

Then, the tire T is positioned at a stacking position 61 (clamping position) in the first direction by the first stopper 15. The stacking position 61 is a position where the tire T is stopped and occupies an area upstream of the first stopper 15 in the transport direction. Accordingly, the tire T is stopped by the first stopper 15 at the stacking position 61 on the first conveyor 5, under conditions where it has been positioned in the first direction and the second direction.

Figure 4:
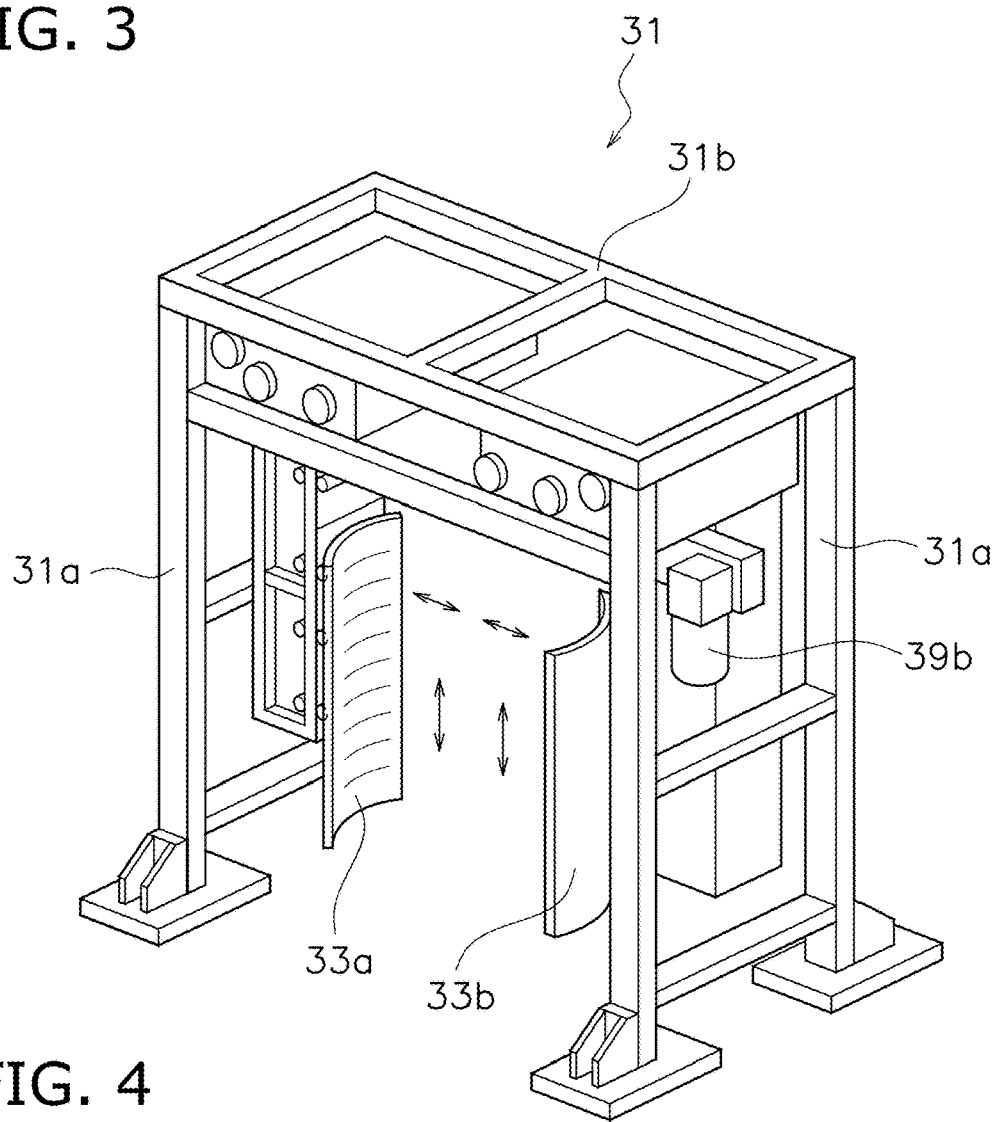
FIG. 4 is a schematic perspective view of a stacking device.
Figure 5:
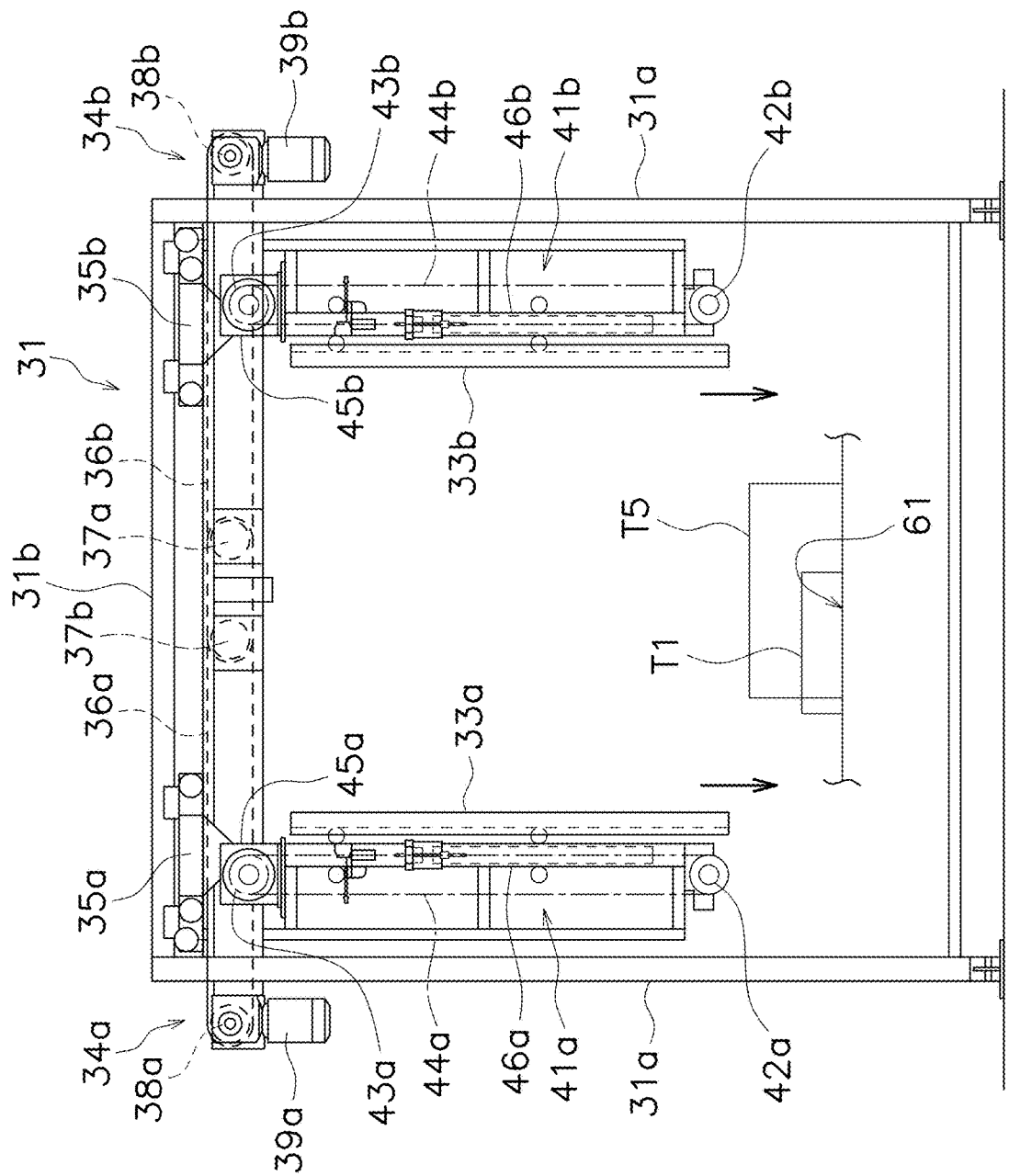
FIG. 5 is a schematic front view of the stacking device.

Referring to FIG. 4 and FIG. 5, the stacking device will be explained. FIG. 4 is a schematic perspective view of the stacking device. FIG. 5 is a schematic front view of the stacking device.

The centering and stacking device 11 includes a stacking device 31 to stack the tires T that have been centered.

The stacking device 31 includes a pair of columns 31a and a ceiling portion 31b including an upper portion connecting the columns 31a. The pair of columns 31a is disposed on both sides of the first conveyor 5 and interposes the stacking position 61 of the first conveyor 5.

The stacking device 31 includes a first clamping portion 33a and a second clamping portion 33b to clamp one or more of tires T. The first clamping portion 33a and the second clamping portion 33b include contact surfaces, which each have a predetermined length in the vertical direction and an arc-shape in a plan view. The first clamping portion 33a and the second clamping portion 33b can simultaneously clamp one tire T or stacked 2-10 tires T for holding, for example. Along the second direction, the first clamping portion 33a is adjacent to the second positioning device 23.

The stacking device 31 includes a first horizontal-direction driving device 34a and a second horizontal-direction driving device 34b, as shown in FIG. 5, which move the first clamping portion 33a and the second clamping portion 33b respectively in a horizontal direction. The first horizontal-direction driving device 34a and the second horizontal-direction driving device 34b include a first cart 35a and a second cart 35b, a first chain 36a and a second chain 36b to drive the first cart 35a and the second cart 35b horizontally, a first sprocket 37a and a second sprocket 37b, a third sprocket 38a and a fourth sprocket 38b, and a first clamping motor 39a and a second clamping motor 39b.

The stacking device 31 includes a first lift apparatus 41a and a second lift device 41b to lift the first clamping portion 33a and the second clamping portion 33b, respectively. The first lift apparatus 41a and the second lift device 41b are disposed in lower portions of the first horizontal-direction driving device 34a and the second horizontal-direction driving device 34b, respectively.

The first lift apparatus 41a includes a first lower sprocket 42a (one example of the lower body) located below in the vertical direction, a first upper sprocket 43a (one example of the upper body) located above in the vertical direction, and a first chain 44a (one example of the connector) connecting the first lower sprocket 42a and the first upper sprocket 43a. The first clamping portion 33a is fixed to the first chain 44a. The first lift apparatus 41a further includes a first lift motor 45a, which drives the first upper sprocket 43a to move the first clamping portion 33a between the upper position and the lower position. The first lift apparatus 41a further includes a first guide portion 46a that guides the first clamping portion 33a along the vertical direction.

The second lift device 41b includes a second lower sprocket 42b (one example of the lower body) located below in the vertical direction, a second upper sprocket 43b (one example of the upper body) located above in the vertical direction, and a second chain 44b (one example of the connector) connecting the second lower sprocket 42b and the second upper sprocket 43b. The second clamping portion 33b is fixed to the second chain 44b. The second lift device 41b further includes a second lift motor 45b, which drives the second upper sprocket 43b to move the second clamping portion 33b between the upper position and the lower position. The second lift device 41b further includes a second guide portion 46b that guides the second clamping portion 33b along the vertical direction.

It should be noted that "upper positions of the first clamping portion 33a and the second clamping portion 33b" means that the lower ends of the first clamping portion 33a and the second clamping portion 33b are positioned at a height so as not to interfere with one tire T1. The upper position may be, for example, an upper position corresponding to the height of the largest tire T, or an upper position corresponding to the kind of a tire T.

It should be further noted that "lower positions of first clamping portion 33a and the second clamping portion 33b" means a height at which the first clamping portion 33a and the second clamping portion 33b do not interfere with the first conveyor 5 when the first clamping portion 33a and the second clamping portion 33b clamp the tires T on the first conveyor 5.

As shown in FIG. 5, the first clamping portion 33a and the second clamping portion 33b are provided such that, in the lower position, the lower ends of the first clamping portion 33a and the second clamping portion 33b are lower than the first lower sprocket 42a and the second lower sprocket 42b. Accordingly, the first clamping portion 33a and the second clamping portion 33b can clamp the tire T at the lowest portion among multiple levels of tires T.

As shown in FIG. 5, the first lower sprocket 42a and the second lower sprocket 42b are disposed at a position higher than the upper surface of the tire T at the highest position. Accordingly, although, in this preferred embodiment, the first lower sprocket 42a and the second lower sprocket 42b are located above the first conveyor 5, the first lower sprocket 42a and the second lower sprocket 42b do not prevent the transportation of tires T.

Figure 6:
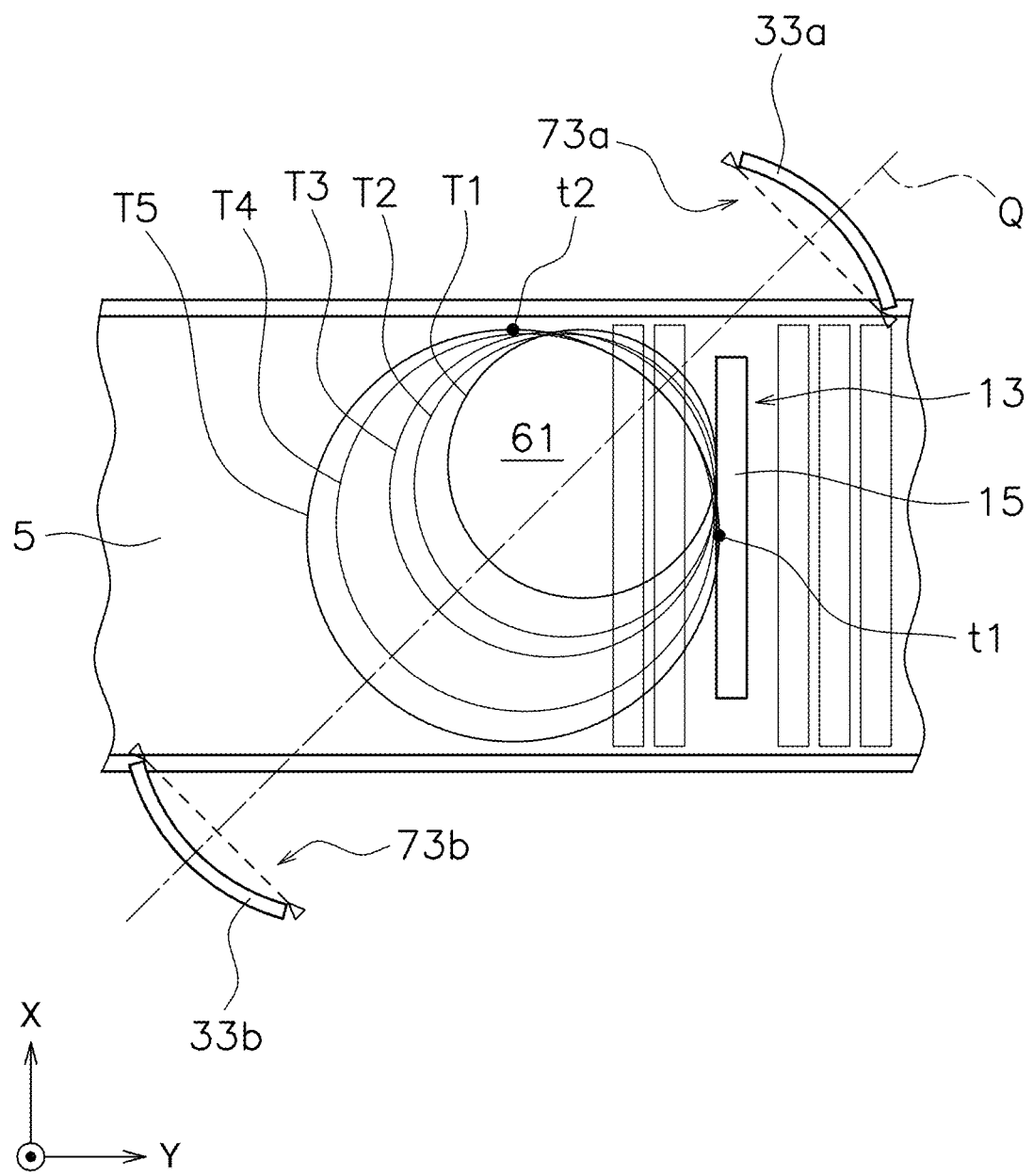
FIG. 6 is a schematic partial plan view for explaining a clamping operation of the stacking device.

The stacking device 31 includes a first clamping sensor 73a and a second clamping sensor 73b (FIG. 6, FIG. 10). The first clamping sensor 73a and the second clamping sensor 73b are sensors that detect the clamping of the tire T by the first clamping portion 33a and the second clamping portion 33b. The first clamping sensor 73a and the second clamping sensor 73b are transmission optical sensors that are respectively provided in the first clamping portion 33a and the second clamping portion 33b. The types of sensors are not limited at all; touch sensors may be provided in the first clamping portion 33a and the second clamping portion 33b to detect contact with the tire T are available.

As shown in FIG. 6, the first clamping sensor 73a and the second clamping sensor 73b each include a light projecting element and a light receiving element located at right and left sides of the front contact surfaces of the first clamping portion 33a and the second clamping portion 33b.

The stacking device 31 includes a tire height sensor 74 (FIG. 10, one example of the detector) that perceives the height of the tires T. The tire height sensor 74 is an optical transmission or reflection optical sensor arranged in the height direction. The types of the sensors are not limited at all. A distance measurement sensor positioned above the tires T may be used. In addition, the locations of the sensors are not limited at all. In addition, the perception of the height of the tires T may be contained in tire information from a higher controller (not shown).

The controller 71 controls, in response to the height of the tires T, driving amounts of the first lift motor 45a and the second lift motor 45b. Accordingly, it is possible to reduce or minimize rising amounts of the first clamping portion 33a and the second clamping portion 33b, thus improving operation efficiency.

The stacking device 31 includes a tire arrival sensor (FIG. 10) that detects arrival of the tire T at the stacking position 61. The tire arrival sensor 75 is an optical transmission or reflection optical sensor provided on both sides of the first conveyor 5. The types of the sensors are not limited at all; a touch sensor may be provided in the first stopper 15 to detect contact with the tire T.

Referring to FIG. 6, the clamping operation of the tires T by the first clamping portion 33a and the second clamping portion 33b of the stacking device 31 will be explained. FIG. 6 is a schematic partial plan view for explaining the clamping operation of the stacking device.

FIG. 6 shows a plurality of kinds of tires T1-T5. Any of the tires T has, after abutting against the first stopper 15 of the first positioning device 13, a tire first portion t1 (one example of the article first portion) adjacent to an end determined by the first positioning device 13 and a tire second portion t2 (one example of the article second portion) adjacent to an end determined by the second positioning device 23. The first-direction position of the tire first portion t1 is determined by the first stopper 15. The second-direction position of the tire second portion t2 has been previously determined by the second stopper 25 of the second positioning device 23. Especially, in the present preferred embodiment, it is assumed that the tire T does not have spun on the first conveyor 5. In this case, a portion that has abutted against the second stopper 25 of the tire T is the tire second portion t2 in the stacking position 61. In FIG. 6, only the tire first portion t1 and the tire second portion t2 of the tire T5 are shown.

Figure 7:
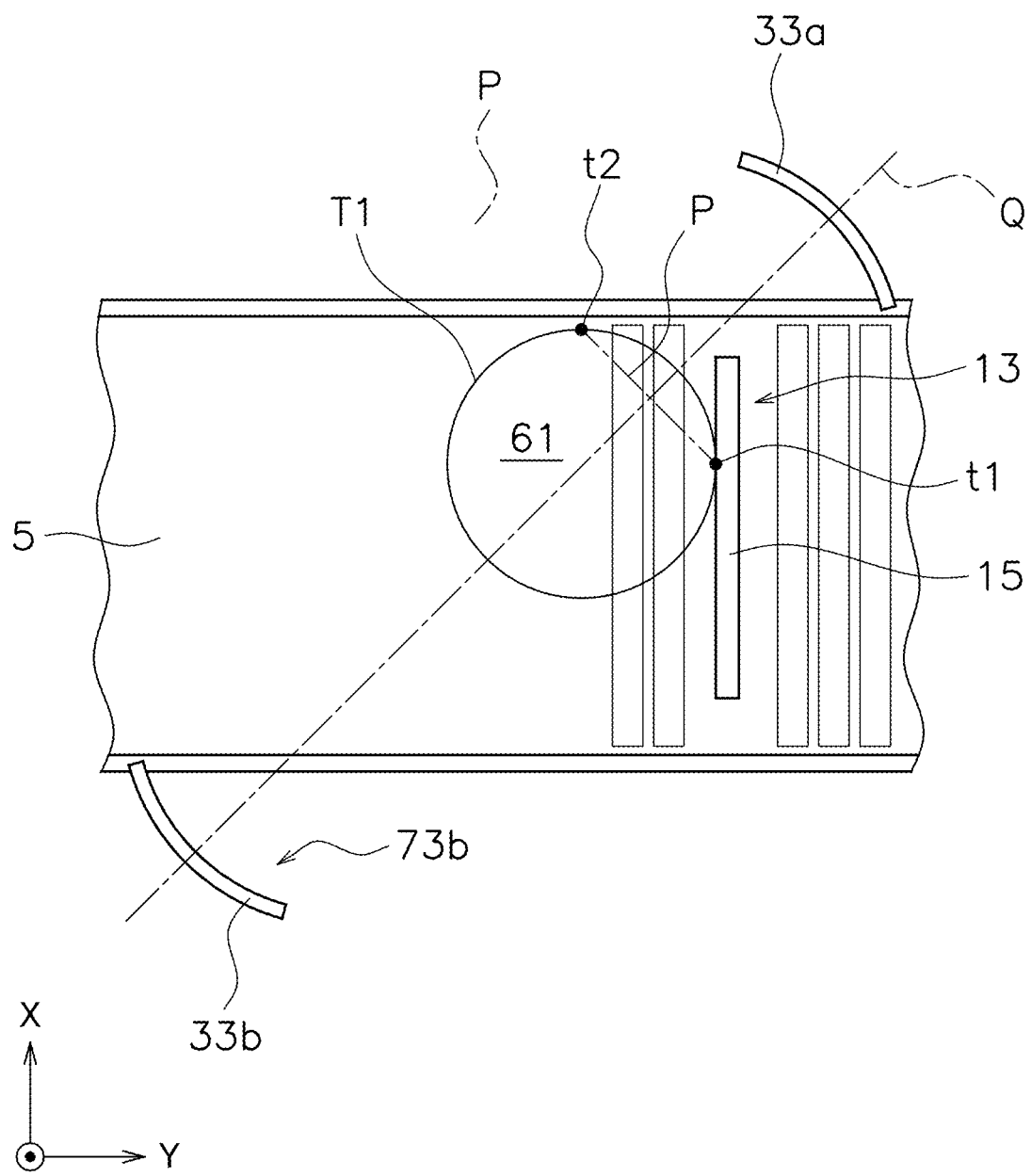
FIG. 7 is a schematic partial plan view for explaining the clamping operation of the stacking device.
Figure 8:
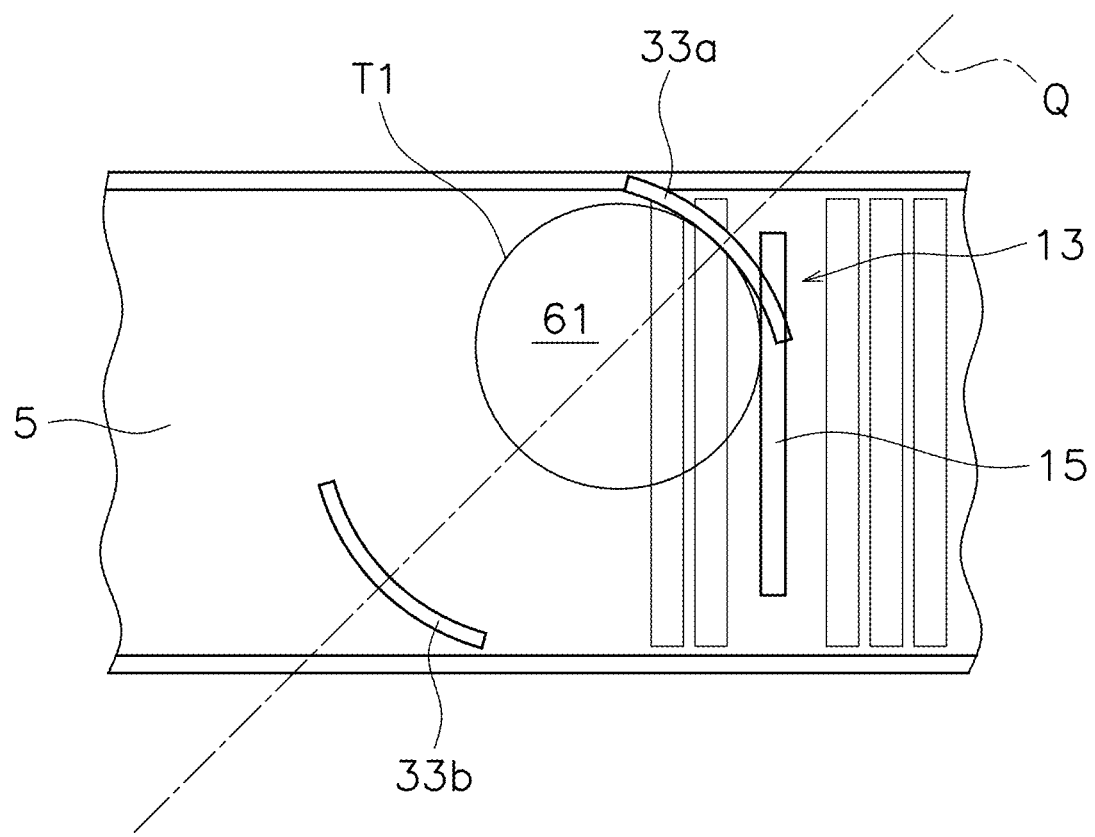
FIG. 8 is a schematic partial plan view for explaining the clamping operation of the stacking device.
Figure 9:
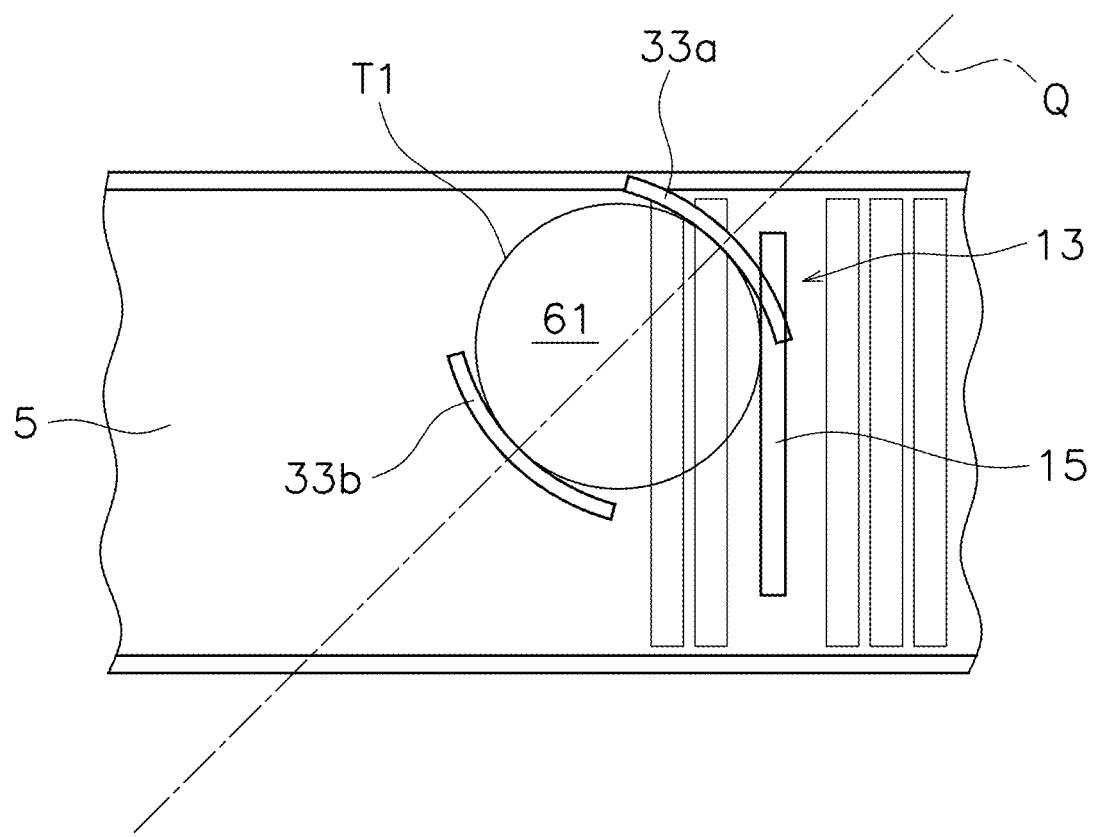
FIG. 9 is a schematic partial plan view for explaining the clamping operation of the stacking device.
Figure 9:
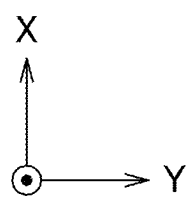

Referring to FIG. 7-FIG. 9, the tire T1 will be explained as an example. FIG. 7-FIG. 9 are schematic partial plan views for explaining the clamping operation of the stacking device. The tire T1 is a tire that has the smallest size (i.e., having the shortest outer diameter).

The first clamping portion 33a and the second clamping portion 33b pass through the tire first portion t1 and the tire second portion t2 of the tire T1 to clamp the side surfaces of the tire T. Specifically, the first clamping portion 33a and the second clamping portion 33b perform the clamping, along a middle of a straight line P connecting the tire first portion t1 and the tire second portion t2, inclined obliquely to the first direction. More specifically, the first clamping portion 33a and the second clamping portion 33b perform the clamping in a third direction (a direction in which the straight line Q extends, the clamp direction) horizontally perpendicular or substantially perpendicular to the straight line P. More specifically, the first clamping portion 33a and the second clamping portion 33b pass through between the tire first portion t1 and the tire second portion t2 (specifically, between the tire first portion t1 and the tire second portion t2 in the straight line P) to clamp the tire T1 in a direction at an angle of about 45 degrees relative to the first direction. Since the center in the clamping direction matches the center of the tire T1, the first clamping portion 33a and the second clamping portion 33b can clamp the tire T1 precisely even if the tire T1 has different outer diameters. In addition, the first positioning device 13 and the stacking device 31 can be made compact.

In the present preferred embodiment, regardless of kinds of the tire T, the center in the clamping direction matches the center of the tire T1. The reason is that two point positioning makes it possible to determine the center since the tire T is circular.

Next, the tire clamping operation will be explained step by step.

At the start, as shown in FIG. 7, the tire T1 is positioned by the first stopper 15.

Next, as shown in FIG. 8, the first clamping portion 33a moves to a position where it gets adjacent to or comes into contact with a side surface of the tire T1.

At end, as shown in FIG. 9, the second clamping portion 33b moves to a position where it comes into contact with a side surface of the tire T1, and further moves toward the first clamping portion 33a to clamp the tire T1 between it and the first clamping portion 33a.

As described above, since the first clamping portion 33a is positioned at a clamp position (regardless of tire size) and then the second clamping portion 33b clamps the tire T, the tire T is not pushed to move. The reason is that the first clamping portion 33a is on the same side of the second positioning device 23 in the second direction. If the second clamping portion 33b is unlike the present preferred embodiment, the tire T is dragged, thus worsening the time efficiency and spinning the tire T.

Referring to FIG. 10, a control configuration of the stacking device 31 will be described. FIG. 10 is a block diagram illustrating the control configuration of the stacking device.

The stacking device 31 includes a controller 71. The controller 71 is a computer system including a processor (e.g., a CPU), a storage device (e.g., a ROM, a RAM, an HDD, an SSD, etc.), and various interfaces (e.g., an A/D converter, a D/A converter, a communication interface, etc.). The controller 71 executes a program stored in a storage (corresponding to a part or the whole of storage area of the storage device) so as to perform various control operations.

The controller 71 may include a single processor or may include a plurality of processors independent of each other for individual controls.

Some or all of the functions of individual elements of the controller 71 may be realized as a program that can be executed by the computer system of the controller 71. Other than that, some of functions of individual elements of the controller 71 may be provided or performed by a custom IC.

The first stopper-driving unit 17, the first lift motor 45a, the second lift motor 45b, the first clamping motor 39a, the second clamping motor 39b, a first clamping sensor 73a, a second clamping sensor 73b, the tire height sensor 74, and the tire arrival sensor 75 are connected to the controller 71.

Although not shown, the controller 71 is connected with sensors to detect size, shape and position of a tire T, sensors to detect conditions of the devices, and switches and information input devices.

Figure 11:
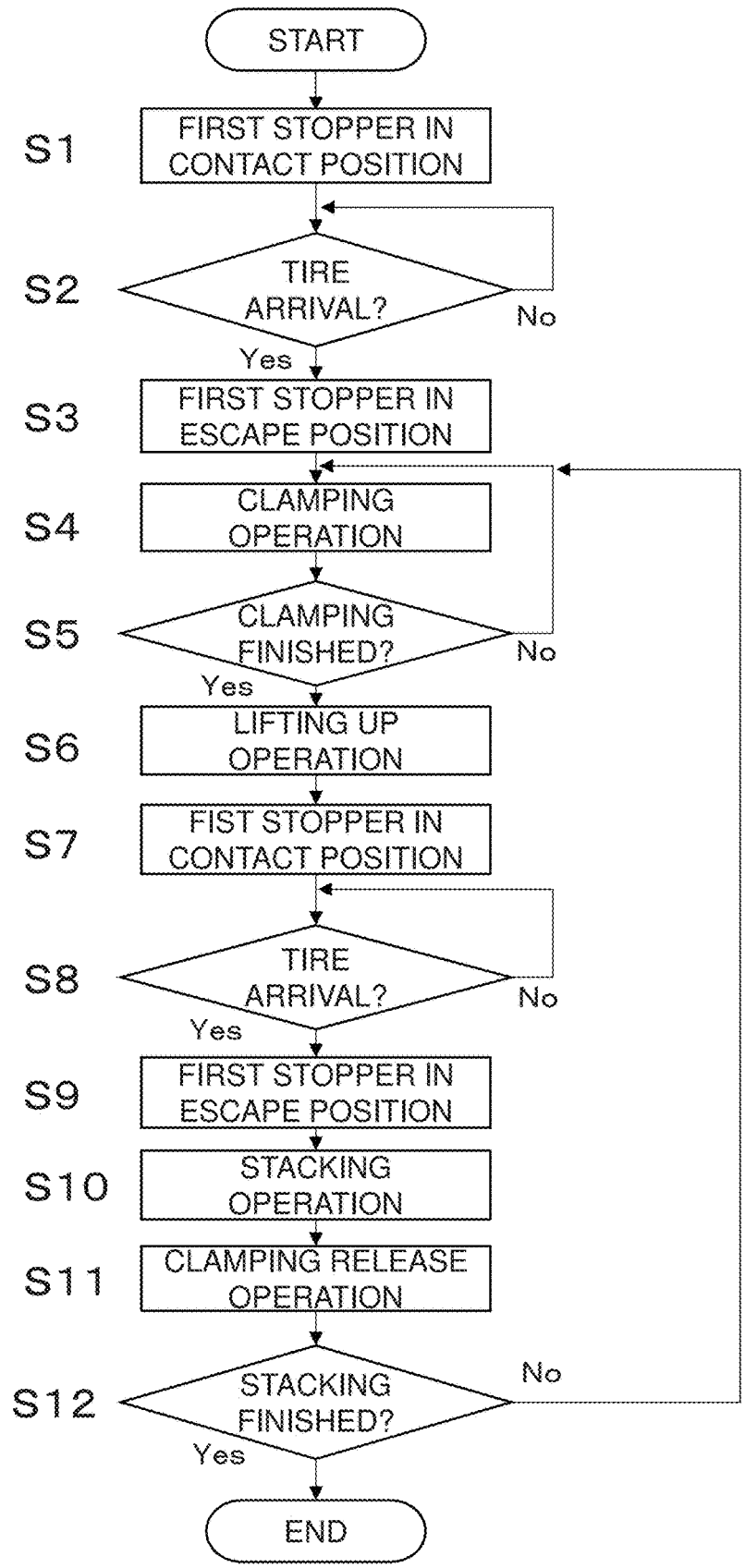
FIG. 11 is a flowchart illustrating the stacking control operation.

Referring to FIG. 11 and FIG. 12-FIG. 24, the stacking control operation will be described. FIG. 11 is a flowchart illustrating the stacking control operation. FIG. 12-FIG. 24 are schematic views illustrating one condition of operations of the pair of clamping portions during the stacking operation.

The control flowchart described below is an example, and each step can be omitted and replaced as necessary. Further, a plurality of steps may be simultaneously executed, or some or all of the steps may be executed in an overlapping manner.

Moreover, each block of the control flowchart is not limited to a single control operation, but can be replaced with a plurality of control operations represented by a plurality of blocks.

An operation of each device is a result of a command from the controller 71 to each device, and the operation is represented by each step of the software/application.

A series of operations among the stacking control operations described below is to stack the same size (kind) of the tires T, and stack different size (kind) of tires after the series of the operations. However, it is not necessary to change size (kind) of tires for each series of the operations.

In addition, prior to the below-described operation, each of the tires T is positioned in the second direction by the second positioning device 23.

At step S1, the first stopper 15 moves to the contact position. Specifically, the controller 71 controls the first stopper-driving unit 17 to perform the movement.

Figure 12:
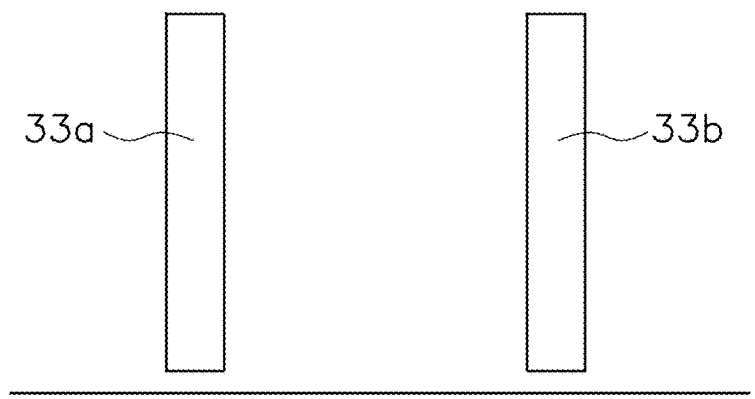
FIG. 12 is a schematic view illustrating one condition of operations of the pair of clamping portions during the stacking operation.
Figure 13:
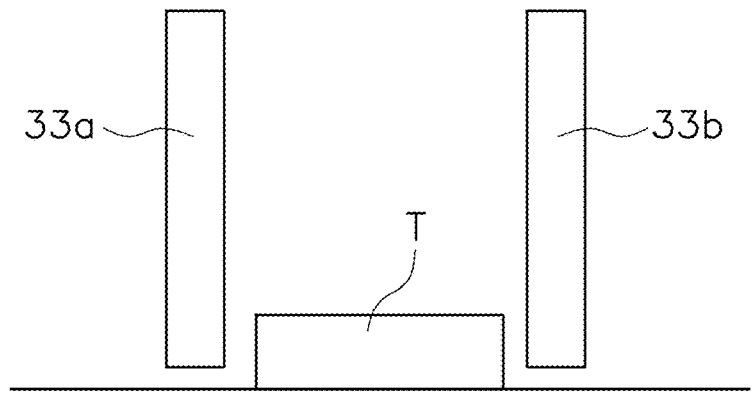
FIG. 13 is a schematic view illustrating one condition of operations of the pair of clamping portions during the stacking operation.

At step S2, the process waits for the tire T to arrive at the stacking position 61. The controller 71 determines the arrival of the tire T based on detection signals from the tire arrival sensor 75. As shown in FIG. 12 and FIG. 13, if the tire T arrives, the process proceeds to step S3.

At step S3, the first stopper 15 moves to the escape position. Specifically, the controller controls the first stopper driving unit 71 to perform the operation.

Figure 14:
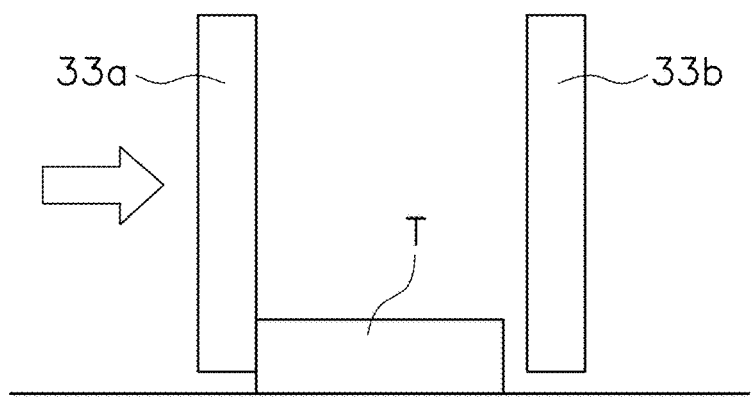
FIG. 14 is a schematic view illustrating one condition of operations of the pair of clamping portions during the stacking operation.
Figure 15:
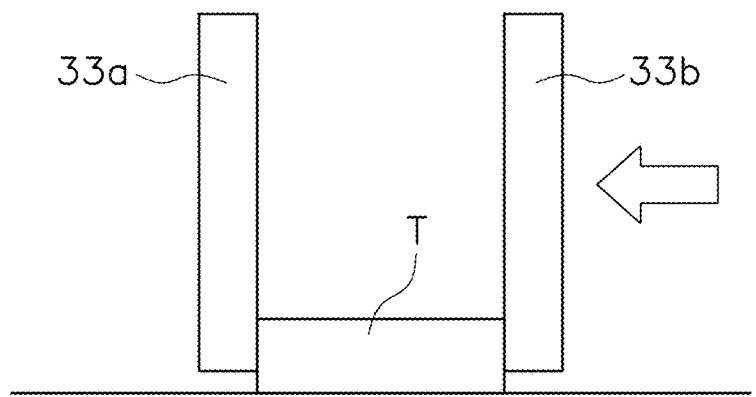
FIG. 15 is a schematic view illustrating one condition of operations of the pair of clamping portions during the stacking operation.

At step S4, the clamping operation is performed in which the first clamping portion 33a and the second clamping portion 33b clamp the tire T. Specifically, as shown in FIG. 14, at start, the first clamping portion 33a moves to a position where it is adjacent to or abuts with the side surface of the tire T. Next, as shown in FIG. 15, the second clamping portion 33b moves to a position where it comes into contact with a side surface of the tire T, and then further moves so as to push the tire T against the first clamping portion 33a. Specifically, the controller 71 controls the first clamping motor 39a and the second clamping motor 39b to perform the operation.

As described above, the controller 71 controls the first clamping motor 39a and the second clamping motor 39b to move the first clamping portion 33a to a position where it comes into contact with or adjacent to the tire T, and then the second clamping portion 33b pushes the tire T to clamp it between the first clamping portion 33a and the second clamping portion 33b. In this case, since the first clamping portion 33a moves first to a predetermined position where it abuts with or is adjacent to the tire T, the motion control of the first clamping portion 33a and the second clamping portion 33b becomes easier.

At step S5, the process waits for the end of the clamping operation. The controller 71 determines the end of the clamping operation based on detections signals from, for example, the second clamping sensor 73b, moving amounts of the second clamping portion 33b after receiving the detection signals, or torque of the second clamping motor 39b.

Figure 16:
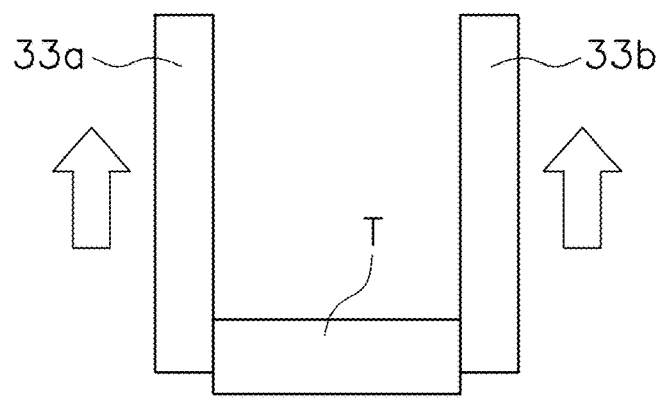
FIG. 16 is a schematic view illustrating one condition of operations of the pair of clamping portions during the stacking operation.

At step S6, as shown in FIG. 16, the first clamping portion 33a and the second clamping portion 33b ascends to lift up the tire T. Specifically, the controller 71 controls the first lift motor 45a and the second lift motor 45b to perform the operation.

At step S7, the first stopper 15 moves to the contact position.

Figure 17:
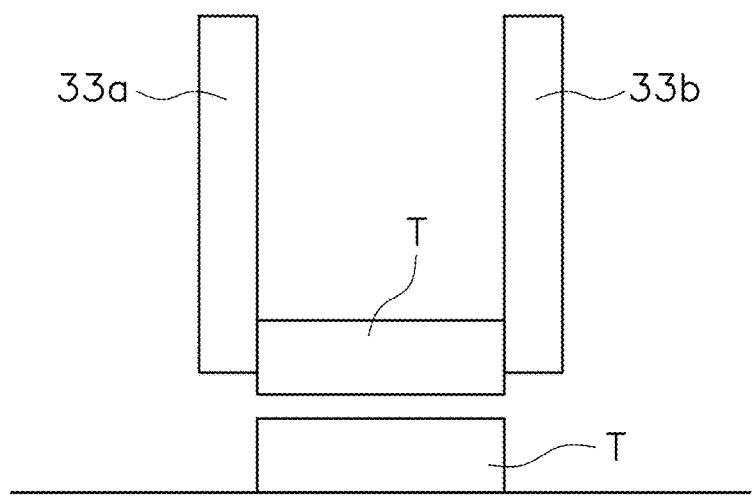
FIG. 17 is a schematic view illustrating one condition of operations of the pair of clamping portions during the stacking operation.

At step S8, the process waits for the next tire T to arrive at the stacking position 61. The controller 71 determines the arrival of tire T based on detection signals from the tire arrival sensor 75. As shown in FIG. 17, if the next tire T arrives, the process proceeds to step S7.

At step 9, the first stopper 15 moves to the escape position.

Figure 18:
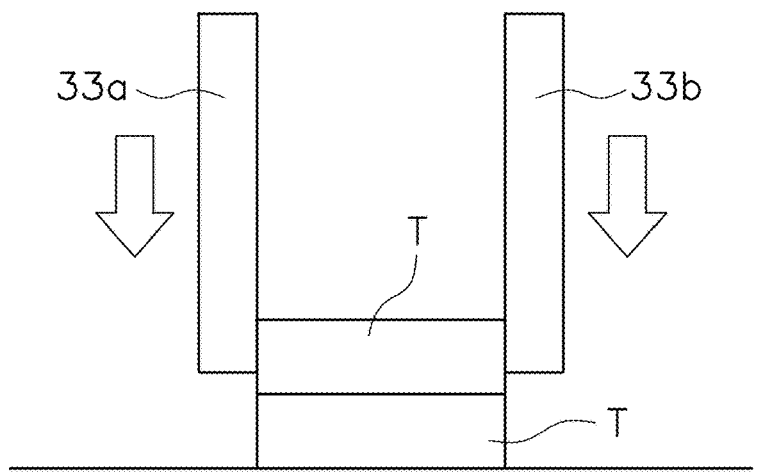
FIG. 18 is a schematic view illustrating one condition of operations of the pair of clamping portions during the stacking operation.

At step S10, as shown in FIG. 18, the first clamping portion 33a and the second clamping portion 33b descends to put down the held tire T onto the below tire T. Specifically, the controller 71 controls the first lift motor 45a and the second lift motor 45b to perform the operation. At this time, since any of the tires T have been positioned at two points by the first positioning device 13 and the second positioning device 23, it can be centered precisely relative to each other during the stacking.

Figure 19:
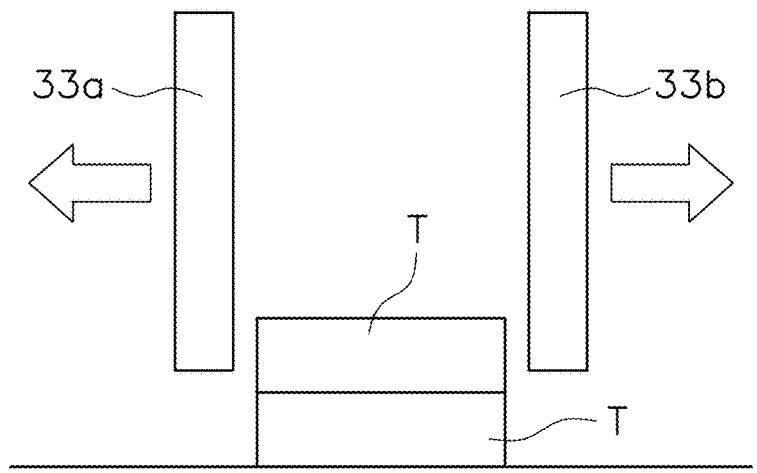
FIG. 19 is a schematic view illustrating one condition of operations of the pair of clamping portions during the stacking operation.
Figure 20:
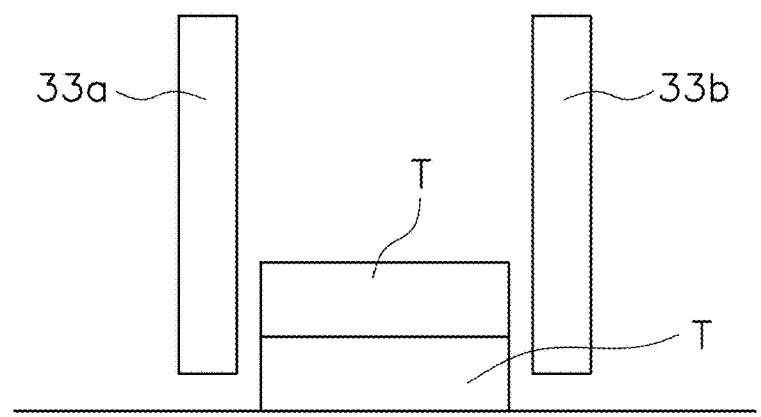
FIG. 20 is a schematic view illustrating one condition of operations of the pair of clamping portions during the stacking operation.
Figure 21:
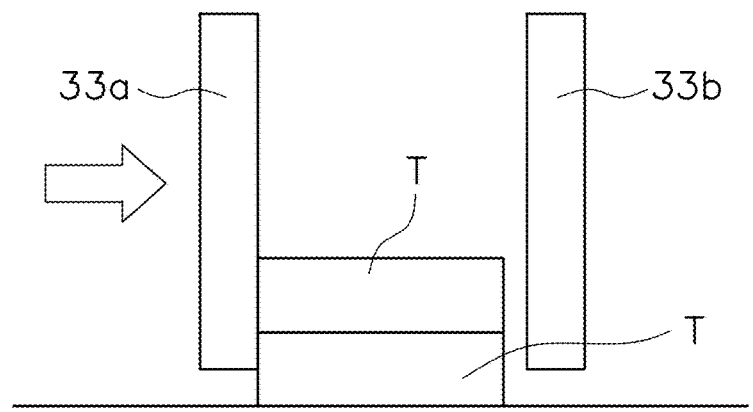
FIG. 21 is a schematic view illustrating one condition of operations of the pair of clamping portions during the stacking operation.
Figure 22:
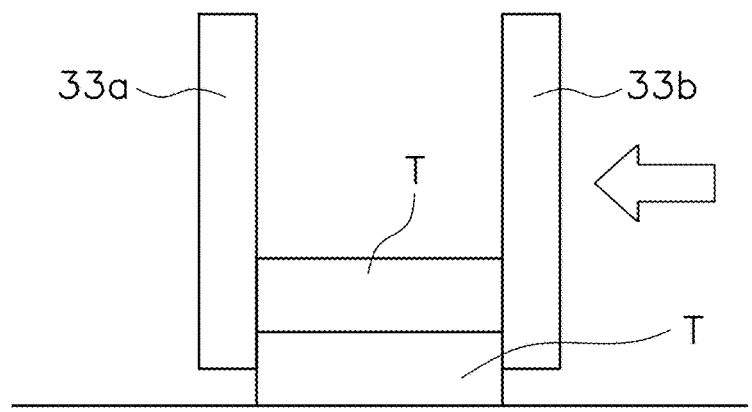
FIG. 22 is a schematic view illustrating one condition of operations of the pair of clamping portions during the stacking operation.

At step S11, as shown in FIG. 19, the first clamping portion 33a and the second clamping portion 33b leaves the tire T laterally to release the clamping. Specifically, the controller 71 controls the first clamping motor 39a and the second clamping motor 39b to perform the operation. Moving amounts of the first clamping portion 33a and the second clamping portion 33b may be controlled by a timer. The first clamping portion 33a and the second clamping portion 33b are separated, moving for the same distance or different distances.

At step S12, it is determined whether or not the stacking operation is finished. If the stacking operation is finished, the process ends. If the stacking operation is not finished, the process goes back to step S4.

After the process, the first conveyor 5 transports the stacked tires T downstream in the transport direction.

Figure 23:
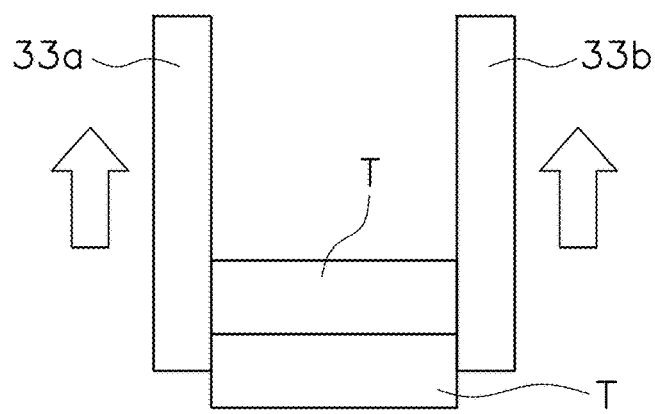
FIG. 23 is a schematic view illustrating one condition of operations of the pair of clamping portions during the stacking operation.
Figure 24:
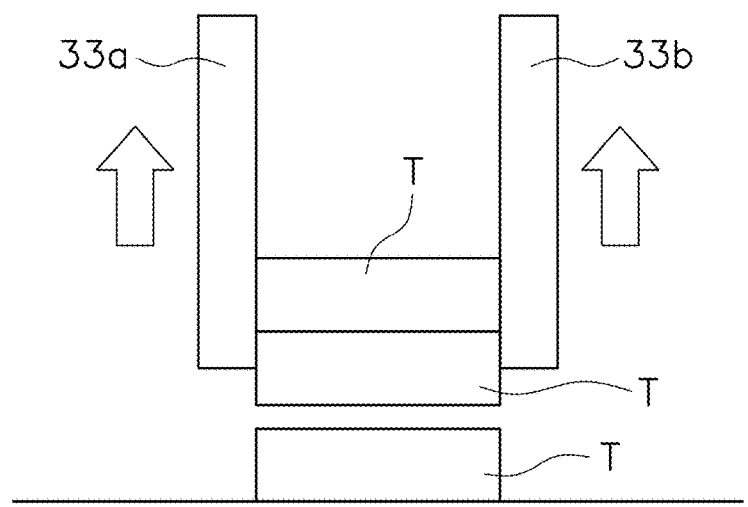
FIG. 24 is a schematic view illustrating one condition of operations of the pair of clamping portions during the stacking operation.

Steps S4-S11 preferably are repeated several times. For example, at step S4, FIG. 20-FIG. 22, the clamping operation of the tire T is performed. At step S6, as shown in FIG. 23, the tire T is lifted. At step S8, as shown in FIG. 24, the process further waits for the next tire T to arrive. Below, further explanation will be omitted.

In the transporting system 1, the first-direction position of the tire T is determined by the first positioning device 13, and the second-direction position of the tire T is determined by the second positioning device 23. Then, a portion of the tire T between the tire first portion t1 tire second portion t2 is clamped by the pair of clamping portions. Accordingly, it is possible to precisely clamp tires T having different outer diameters.

The operation after the tire T stacking will be described.

After the stacking, for example, the stacked tires T are transported collectively by a transport apparatus supporting the inner diameter of tire T (or supporting the lower portion of the tire T).

Although the stacked tires T present partially on one side in the second direction, the centers of the tires are aligned to the transfer position by the same mechanism as the second-direction adjustment conveyor.

Accordingly, the transport apparatus can support the tires T at a fixed position.

Second Preferred Embodiment

Although, in the first preferred embodiment, the second positioning device comes into contact with the tire T to position the end of the tire T at the second predetermined position in the second direction, the second positioning device may position the tire T in the second direction using a non-contact method.

Figure 25:
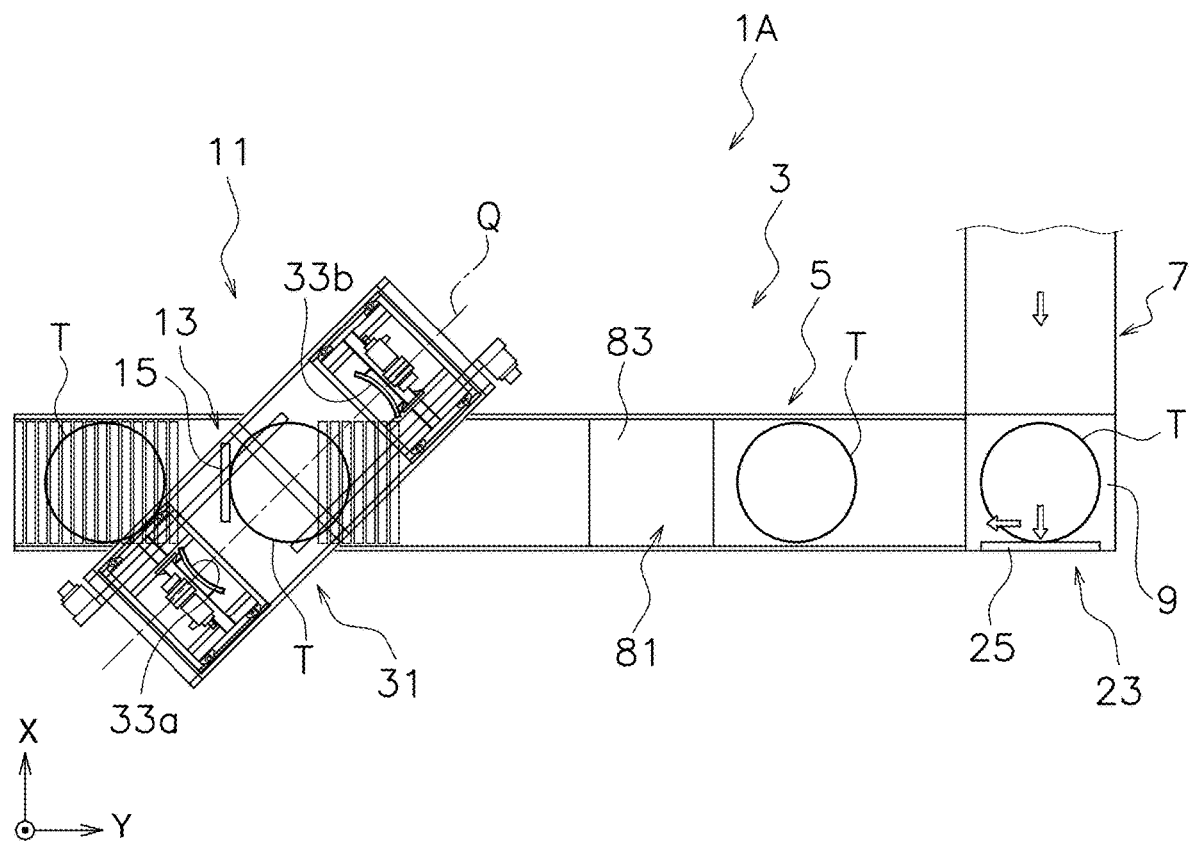
FIG. 25 is a schematic plan view of a transporting system according to a second preferred embodiment of the present invention.
Figure 26:
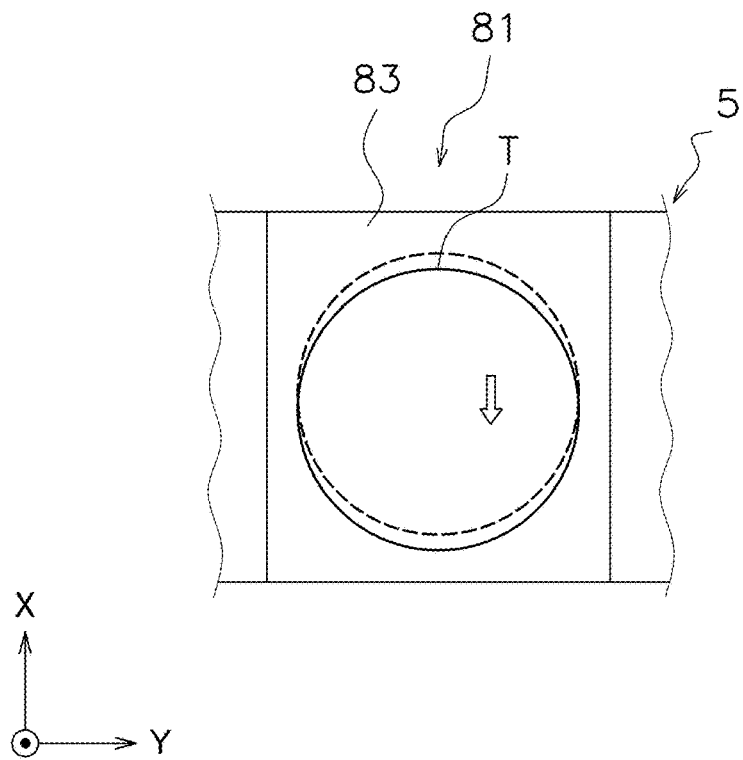
FIG. 26 is a schematic plan view of the second positioning device.
Figure 27:
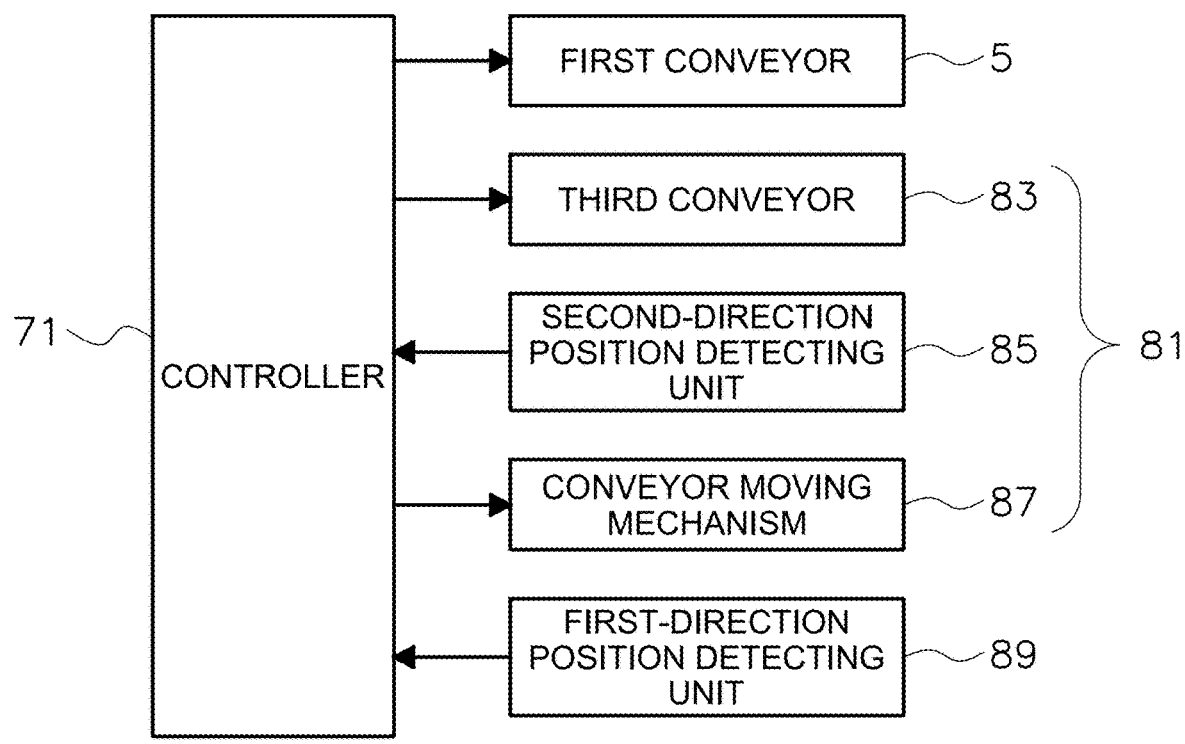
FIG. 27 is a block diagram illustrating the control configuration of the second positioning device.
Figure 28:
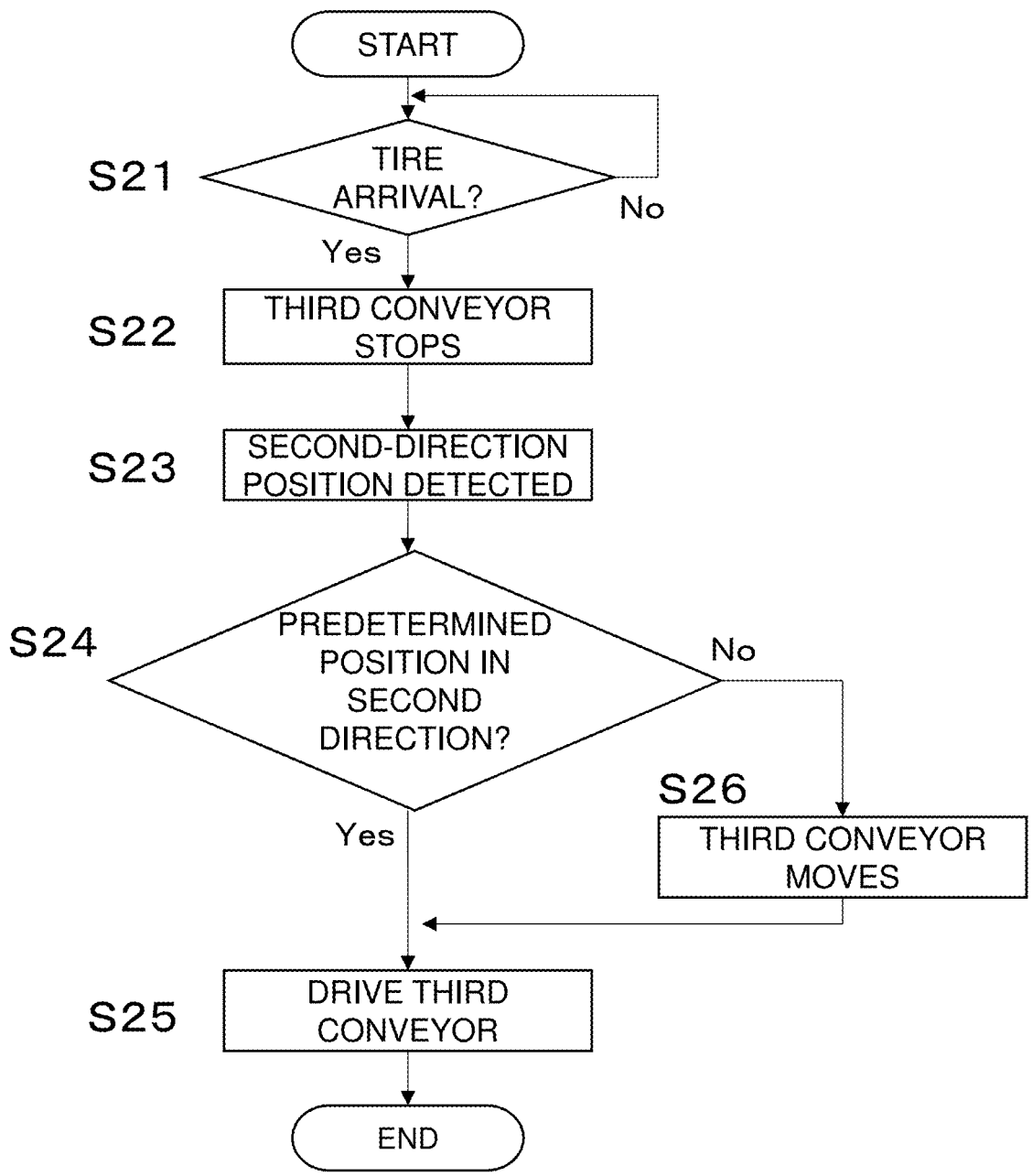
FIG. 28 is a flowchart illustrating the second positioning control operation.

Referring to FIG. 25-FIG. 28, a second preferred embodiment of the present invention will be described as such an example. FIG. 25 is a schematic plan view of a transporting system according to the second preferred embodiment. FIG. 26 is a schematic plan view of the second positioning device. FIG. 27 is a block diagram illustrating the control configuration of the second positioning device. FIG. 28 is a flowchart illustrating the second positioning control operation. FIG. 27 depicts limited configuration only necessary for the below description, unlike FIG. 10 in the first preferred embodiment.

It should be noted that the basic structures and operations of the second preferred embodiment are the same or substantially the same as those of the first preferred embodiment; different points will be mainly described below.

The transporting system 1A includes, as shown in FIG. 25, a second positioning device 81 (one example of the second positioner). The second positioning device 81 is a device that positions an end of the tire T at the second predetermined position in the second direction.

The second positioning device 81 includes a third conveyor 83 (one example of the second-direction adjustment conveyor) that transports the article in the first direction. The third conveyor 83 is located on the first conveyor 5 upstream of the first positioning device 13 in the transport direction (the first direction). The third conveyor 83 is a roller conveyor similar to the first conveyor 5, and is driven by a driving source different from the first conveyor 5. The third conveyor 83 is movable relative to the first conveyor 5 in the second direction. Specifically, the third conveyor 83 is located on rails extending in the second direction, for example.

The second positioning device 81 includes a second-direction position detecting unit 85 (one example of the second-direction position detector), which is, as shown in FIG. 27, able to detect the second-direction position of an article using a non-contact method. Specifically, the second-direction position detecting unit 85 detects, in the second positioning device 81 (in other words, in the third conveyor 83), the second-direction position of the tire T. The second-direction position detecting unit 85 may be an imaging device such as a photoelectric sensor or a camera, for example.

The second positioning device 81 includes, as shown in FIG. 27, a conveyor moving mechanism 87 to move, based on the information from the second-direction position detecting unit 85, the third conveyor 83 in the second direction so as to position the tire T at a desired position in the second direction. Specifically, the conveyor moving mechanism 87 includes a motor (not shown) and a power transmission mechanism (not shown).

The transporting system 1A includes, as shown in FIG. 27, a first-direction position detecting unit 89 that detects the arrival of the tire T at the second positioning device 81. The first-direction position detecting unit 89 includes, for example, a photoelectric sensor. The tire T is positioned in the first direction by contact of a stopper, for example.

Referring to FIG. 28, the second-direction positioning control operation will be described. It is assumed that the tire T has been moved by the first conveyor 5 toward the first positioning device 13.

At step S21, the process waits for the tire T to arrive at the second positioning device 81. Specifically, the controller 71 performs the determination based on detecting signals from the first-direction position detecting unit 89.

At step S22, the operation of the third conveyor 83 is stopped. Specifically, the controller 71 stops the third conveyor 83. Accordingly, the tire T is stopped on the third conveyor 83.

At step S23, the second-direction position of the tire T is detected. Specifically, the controller 71 performs the determination based on detection signals from the second-direction position detecting unit 85.

At step S24, it is determined whether or not the second-direction position of the tire T is positioned at a predetermined position. The predetermined position is a position determined by, for example, the second positioning device 23, or is a position matching the end of the tire T determined by the second positioning device 23 in the second direction. The predetermined position may be a clamping position, i.e., a certain position on the first conveyor 5 in the second direction. If it is positioned at the predetermined position, the process proceeds to step S25. If it is displaced from the predetermined position, the process moves to step S26.

At step S25, the driving of the third conveyor 83 is started. Specifically, the controller 71 drives the third conveyor 83.

At step S26, the conveyor moving mechanism 87 drives the third conveyor 83, as shown in FIG. 26, to move the tire T toward either side in the second direction to the desired second-direction position. Specifically, the controller 71 controls the conveyor moving mechanism 87 to drive the third conveyor 83.

In the transporting system 1A, the conveyor moving mechanism 87 moves the third conveyor 83 in the second direction to position the second-direction end of the tire T at the second predetermined position. The tire T does not move relative to the third conveyor 83 when the tire T is moved in the second direction, so the second-direction position of the tire T is accurately positioned.

As a modification of the second preferred embodiment, the second positioning device 23 may be omitted.

As a modification of the second preferred embodiment, the third conveyor may be a chain conveyor that can proceed or recede through rollers of the first conveyor 5, for example. In this case, the third conveyor temporarily stops the tire T that has been transported on the first conveyor 5, then protrudes above the transport surface 5a of the first conveyor 5 to lift up the tire T, and finally drives the tire T under this condition to move in the second direction. After that, the third conveyor recedes below the transport surface 5a of the first conveyor 5 to transfer the tire T onto the first conveyor 5.

Third Preferred Embodiment

Figure 29:
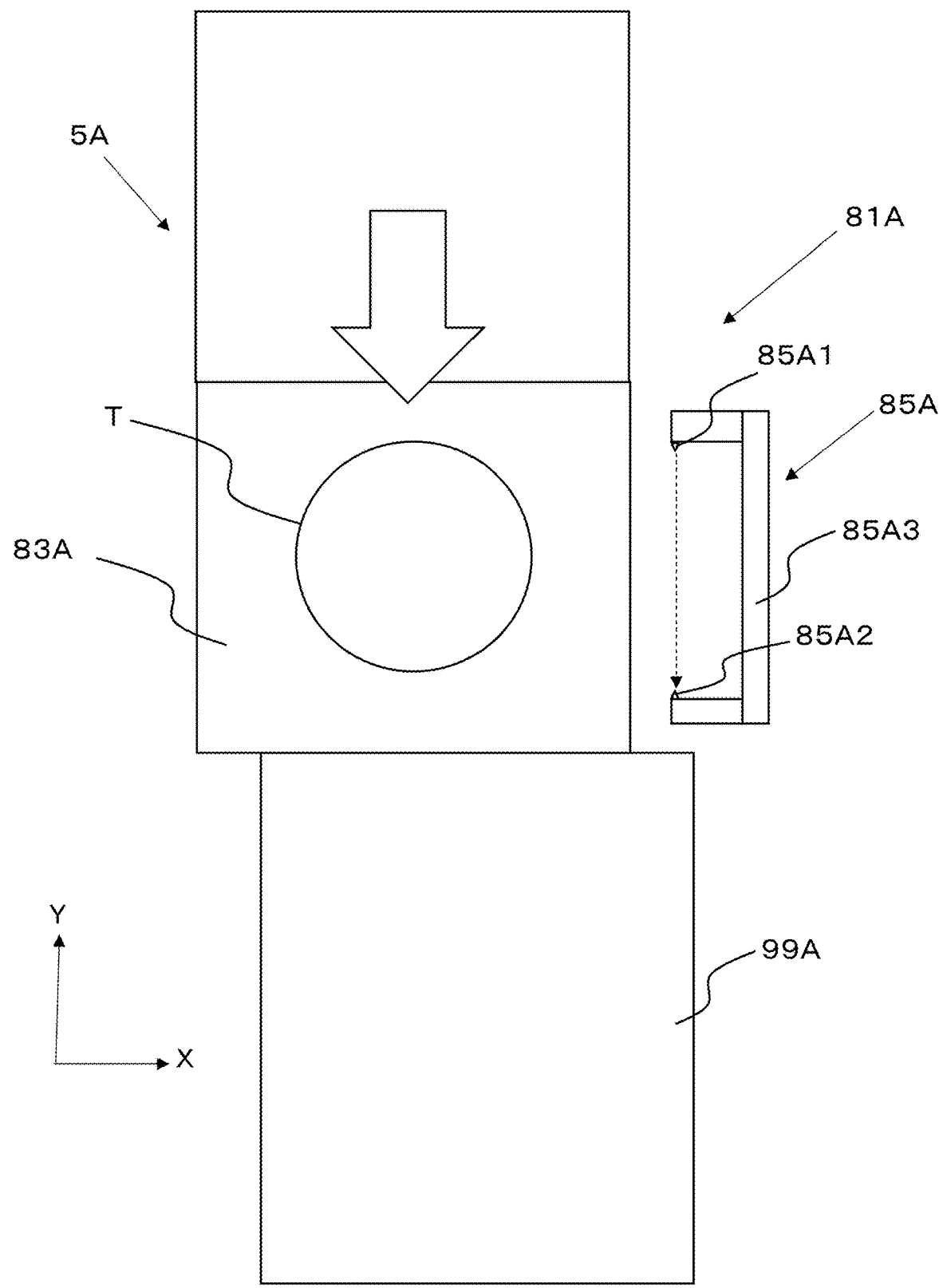
FIG. 29 is a schematic plan view illustrating operations of a second positioning device according to a third preferred embodiment of the present invention.
Figure 30:
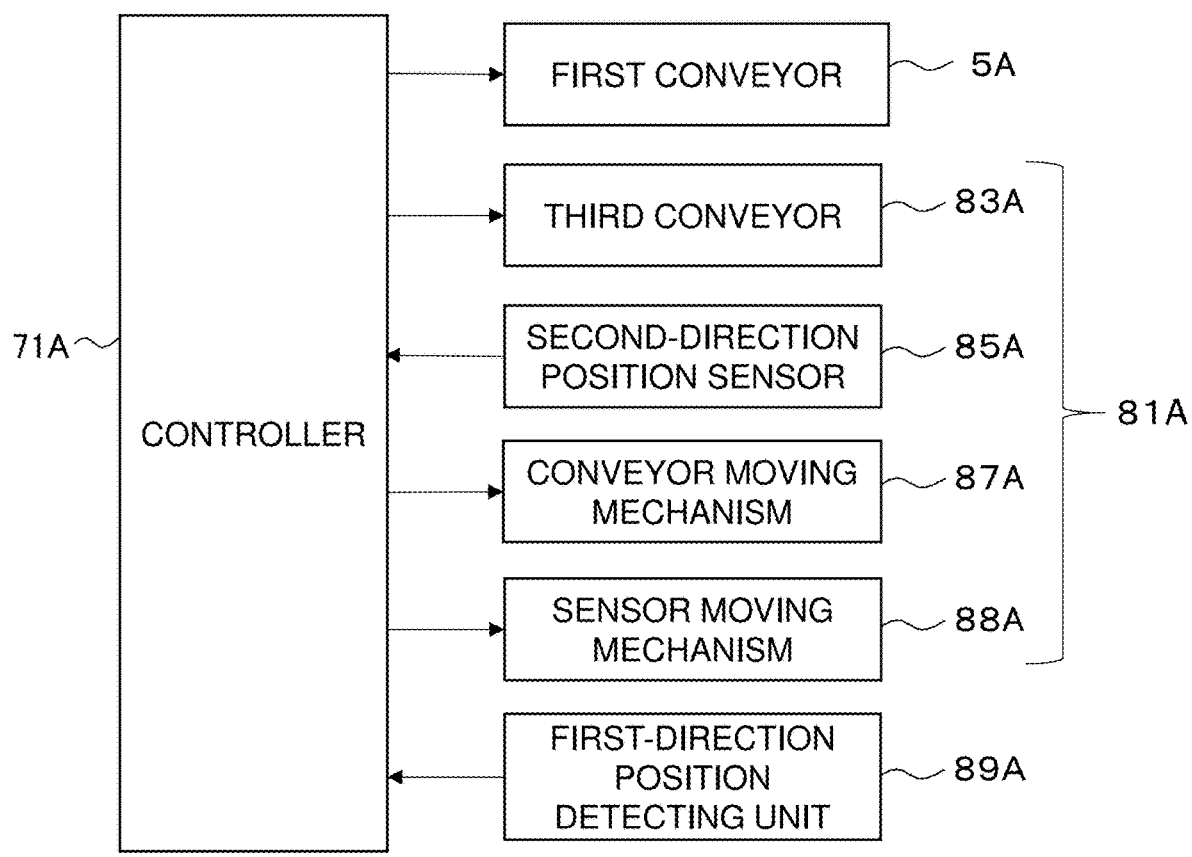
FIG. 30 is a block diagram illustrating the control configuration of the second positioning device.

Referring to FIG. 29-FIG. 34, a third preferred embodiment of the present invention will be described as a modification of the second preferred embodiment. FIGS. 29 and 31-34 are schematic plan views illustrating operations of the second positioning device according to the third preferred embodiment. FIG. 30 is a block diagram illustrating the control configuration of the second positioning device.

The transporting system 1A includes, as shown in FIG. 29, the second positioning device 81A (one example of the second positioner) to position the second-direction end of the tire T at the second predetermined position.

The second positioning device 81A includes a third conveyor 83A (one example of the second-direction adjustment conveyor) that transports the tire T in the first direction. The third conveyor 83A is located, in the first conveyor 5A, upstream of the first positioning device in the transport direction (the first direction). The third conveyor 83A is a roller conveyor similar to the first conveyor 5A, and is driven by a driving source different from that of the first conveyor 5A. The third conveyor 83A is movable in the second direction relative to the first conveyor 5A. Specifically, the third conveyor 83A is located on rails (not shown) extending in the second direction, for example.

The second positioning device 81A includes, as shown in FIG. 30, a conveyor moving mechanism 87A (one example of the mover). The conveyor moving mechanism 87A moves the third conveyor 83A in the second direction so as to position the tire T at a desired position in the second direction. Specifically, the conveyor moving mechanism 87 includes a motor (not shown) and a power transmission mechanism (not shown).

The second positioning device 81A includes, as shown in FIG. 29, a second-direction position sensor 85A (one example of the second-direction position detector) that detects the second-direction position of an article by a non-contact method. Specifically, the second-direction position sensor 85A detects, in the second positioning device 81A (in other words, in the third conveyor 83A), the second-direction position of tire T. The second-direction position sensor 85A is, for example, a photoelectric sensor.

Specifically, the second-direction position sensor 85A is located on one side of the third conveyor 83A in the second direction, and includes a light projecting element 85A1 and a light receiving element 85A2 that define an optical axis extending in the first direction, and a frame 85A3. The frame 85A3 includes a first portion extending in the first direction and pair of the second portions extending from the ends of the first portion in the second direction.

The second positioning device 81A includes, as shown in FIG. 30, a sensor moving mechanism 88A (one example of the detector mover). The sensor moving mechanism 88A moves the second-direction position sensor 85A in the second direction between the escape position and the detecting position. Specifically, the sensor moving mechanism 88A includes a motor (not shown) and a power transmission mechanism (not shown).

In the escape position, as shown in FIG. 29, the second-direction position sensor 85A is located outward in the second direction (far from the third conveyor 83A). In other words, regardless of the second-direction position of the third conveyor 83A, the second-direction position sensor 85A is completely displaced from the third conveyor 83A in the second direction.

Figure 31:
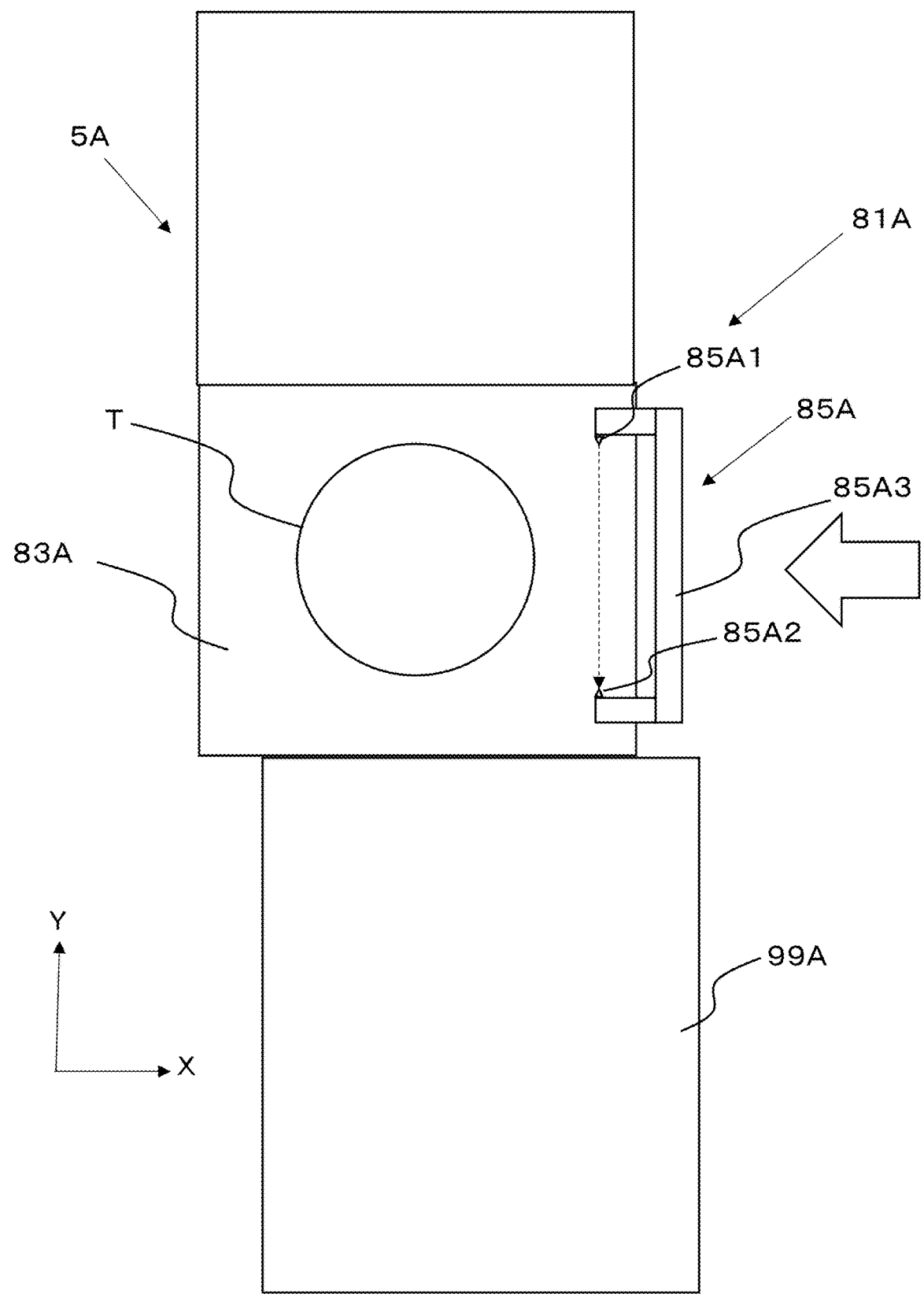
FIG. 31 is a schematic plan view illustrating operations of the second positioning device according to the third preferred embodiment of the present invention.

In the detecting position, as shown in FIG. 31, the second-direction position sensor 85A is located inward in the second direction (near the third conveyor 83A). More specifically, the second-direction position sensor 85A is positioned inward in the second direction from a conveyor 99A that is downstream of the third conveyor 83A in the transport direction.

The position of the optical axis in the detecting position is the same as the predetermined position that is determined in the second preferred embodiment. The detecting position is farther inward in the second direction than the conveyor 99A. The transporting system 1A includes a first-direction position detecting unit 89A, as shown in FIG. 30, which detects the arrival of the tire T in the second positioning device 81A. The first-direction position detecting unit 89A is, for example, a photoelectric sensor. The positioning of the tire T in the first direction may be performed by contact of a stopper, for example.

Next, the second-direction positioning control operation will be described. It is assumed that the tire T has been moved by the first conveyor 5 toward the first positioning device 13.

At the start, the process waits for the tire T to arrive at the second positioning device 81A. Specifically, the controller 71A performs the determination based on detection signals from the first-direction position detecting unit 89A. At this time, since the second-direction position sensor 85A is positioned in the escape position, the tire T never abuts against the second-direction position sensor 85A.

Next, as shown in FIG. 29, the driving of the third conveyor 83A is stopped. Specifically, the controller 71A stops the third conveyor 83A. Accordingly, the tire T is stopped on the third conveyor 83A.

Next, as shown in FIG. 31, the second-direction position sensor 85A is moved from the escape position to the detecting position. Specifically, the controller 71A drives the sensor moving mechanism 88A.

Figure 32:
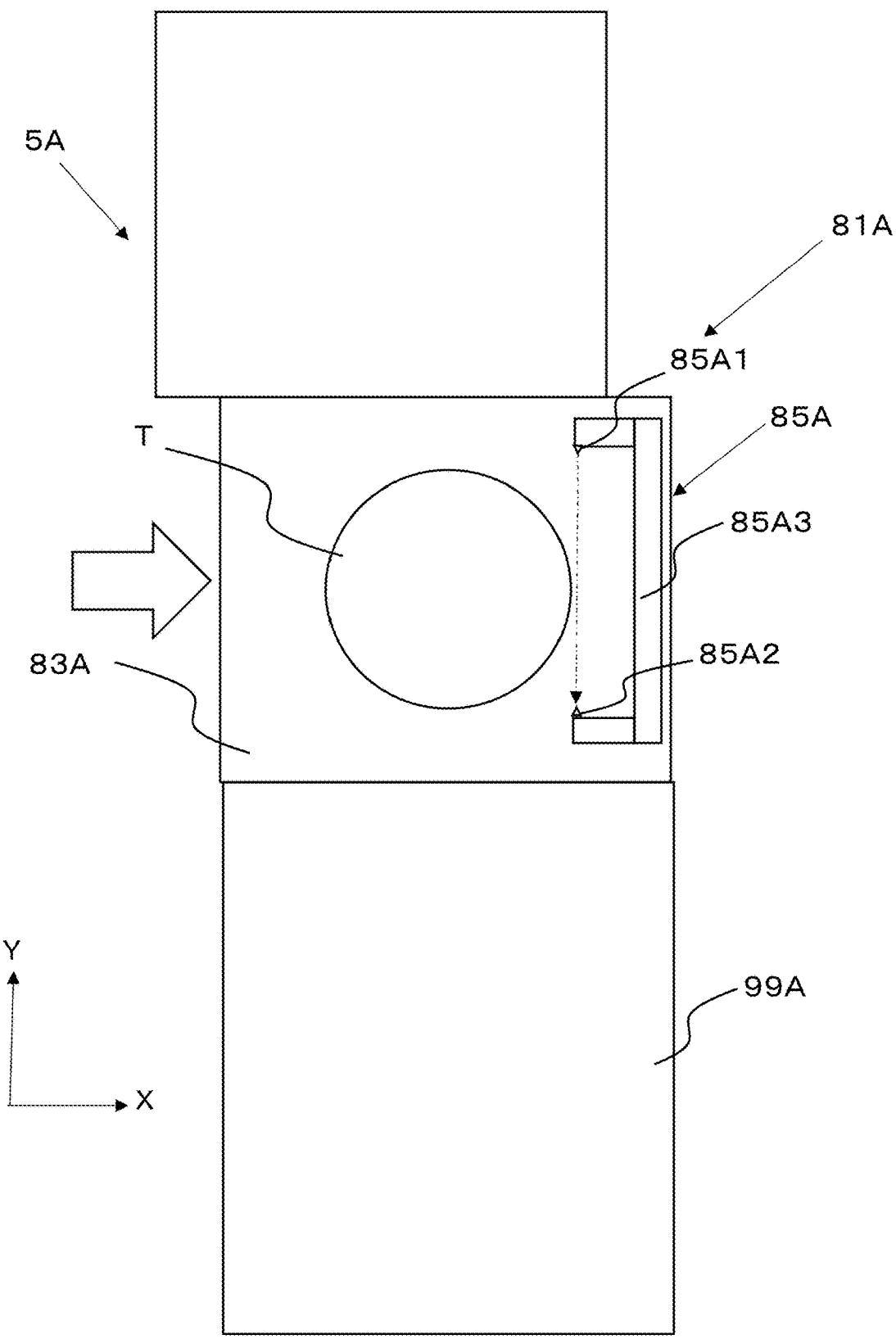
FIG. 32 is a schematic plan view illustrating operations of the second positioning device according to the third preferred embodiment of the present invention.

Next, as shown in FIG. 32, the third conveyor 83A is driven in the second direction. Then, if the second direction end of tire T is detected by the second-direction position sensor 85A, the movement of the third conveyor 83A in the second direction is stopped. As a result, the second-direction position of tire T is positioned at the predetermined position. At this time, one-side end of the tire T in the second direction is located within a second direction area of the conveyor 99A that is downstream in the transport direction.

Figure 33:
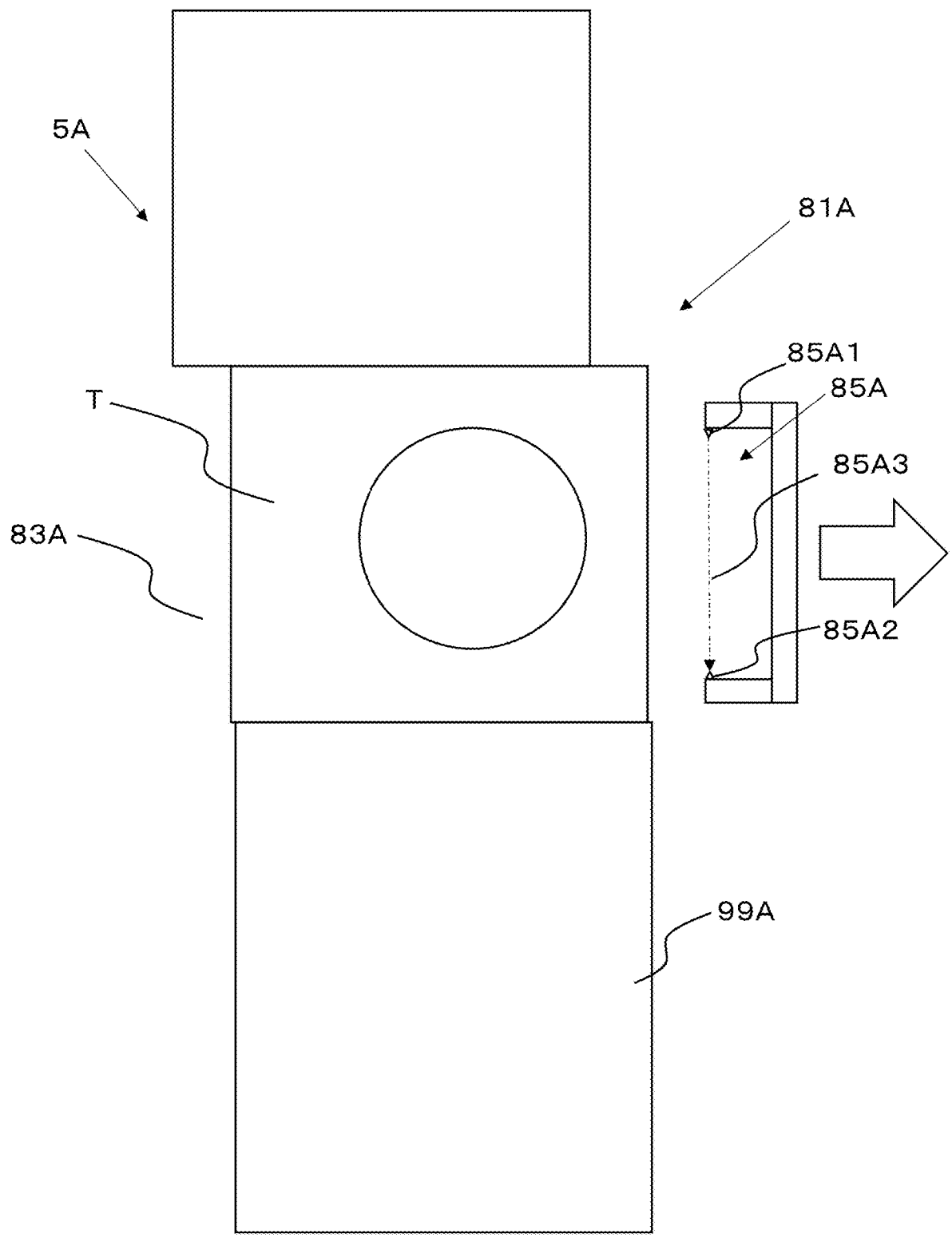
FIG. 33 is a schematic plan view illustrating operations of the second positioning device according to the third preferred embodiment of the present invention.

As shown in FIG. 33, the second-direction position sensor 85A is moved from the detecting position to the escape position. Specifically, the controller 71A drives the sensor moving mechanism 88A.

Figure 34:
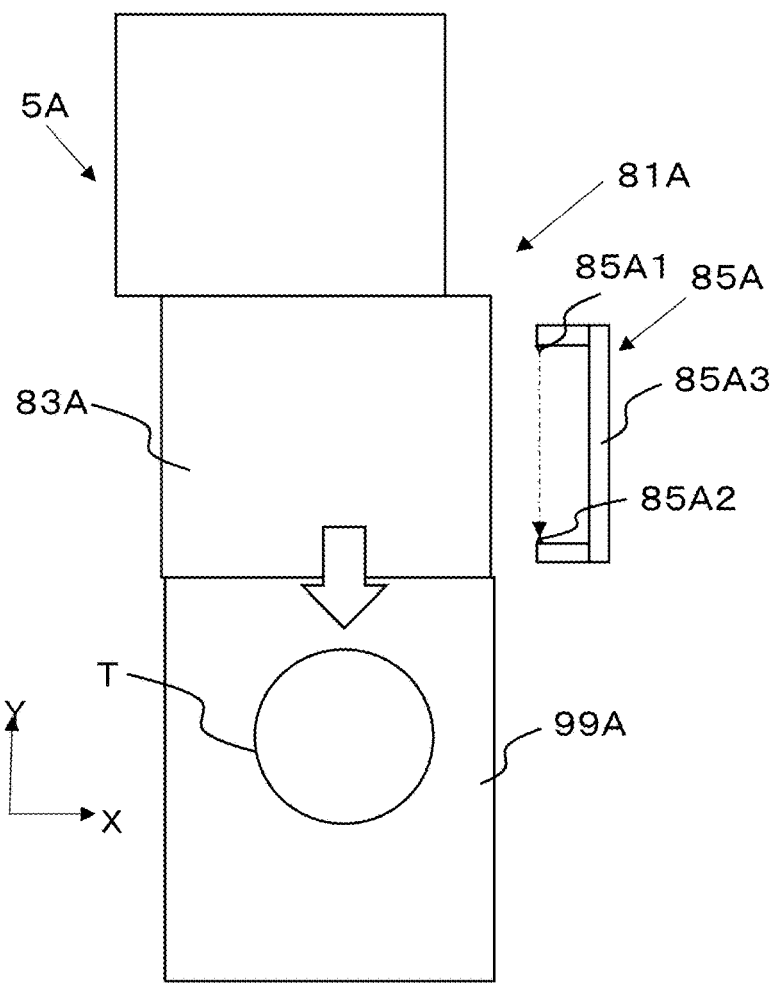
FIG. 34 is a schematic plan view illustrating operations of the second positioning device according to the third preferred embodiment of the present invention.

As shown in FIG. 34, the driving of the third conveyor 83A is started, and the tire T is moved in the first direction. Specifically, the controller 71 drives the third conveyor 83. At this time, since the second-direction position sensor 85A is positioned in the escape position, the tire T never abuts against the second-direction position sensor 85A. In addition, since the one-side end of the tire T in the second direction is positioned inward of the conveyor 99A in the second direction, downstream in the transport direction, the tire T never abuts against the conveyor 99A positioned downstream in the transport direction.

In the transporting system 1A, the conveyor moving mechanism 87 moves the third conveyor 83A in the second direction to position the end of the tire T in the second direction at the second predetermined position. Since the tire T does not move relative to the third conveyor 83A when the tire T is moved in the second direction as described above, the second-direction position of the tire T can be accurately determined.

Fourth Preferred Embodiment

Although, in the first preferred embodiment and the second preferred embodiment, the first positioning device abuts against the tire T to position the end of an article transported by a conveyor at the first predetermined position in the first direction, the first positioning device may position the tire T in the first direction by a non-contact method.

Figure 35:
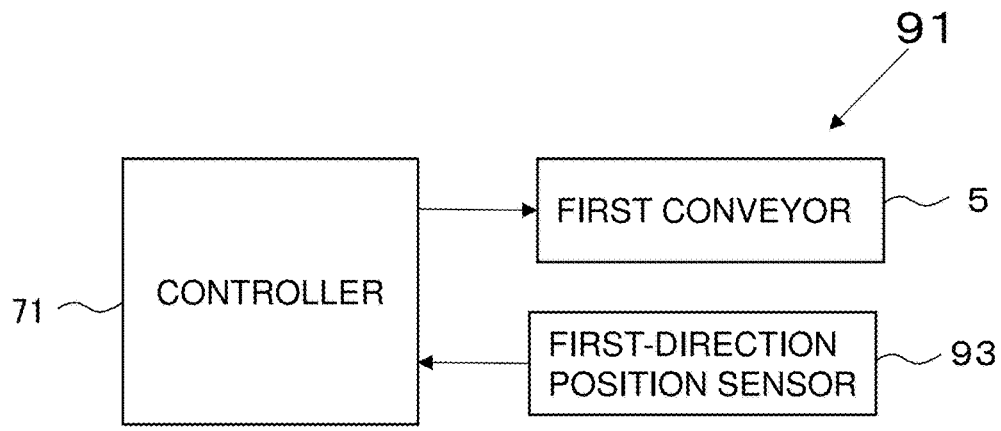
FIG. 35 is block diagram illustrating a control configuration of a first positioning device according to a fourth preferred embodiment of the present invention.

Referring to FIG. 35, a fourth preferred embodiment of the present invention will be described as such a preferred embodiment. FIG. 35 is block diagram illustrating the control configuration of the first positioning device in the fourth preferred embodiment. FIG. 35 depicts limited configuration only necessary for the below explanation, unlike FIG. 10 in the first preferred embodiment.

The basic structure and operation of the fourth preferred embodiment are the same as those of the first preferred embodiment; different points will be mainly described below.

In this preferred embodiment, unlike the first preferred embodiment, the stacking position 61 is not provided with the first stopper 15.

The first positioning device 91 includes a first-direction position sensor 93 (one example of the first-direction position detector). The first-direction position sensor 93 is provided in the stacking position 61, and detects one end of the tire T in the first direction using a non-contact method. The first-direction position sensor 93 is, for example, a photoelectric sensor.

When the first-direction position sensor 93 detects the end of tire T, the controller 71 stops the transportation of the tire T by the first conveyor 5.

In the transporting system, if the end of the tire T in the first direction is detected by the first-direction position sensor 93, the first conveyor 5 is stopped so that the first-direction end of tire T is positioned at the first predetermined position.

Then, the first clamping portion 33a and the second clamping portion 33b are moved defining 45 degrees relative to the first direction, which is the transport direction. Accordingly, the first positioning device 91 as well as the first clamping portion 33a and the second clamping portion 33b can be made compact.

Fifth Preferred Embodiment

Figure 36:
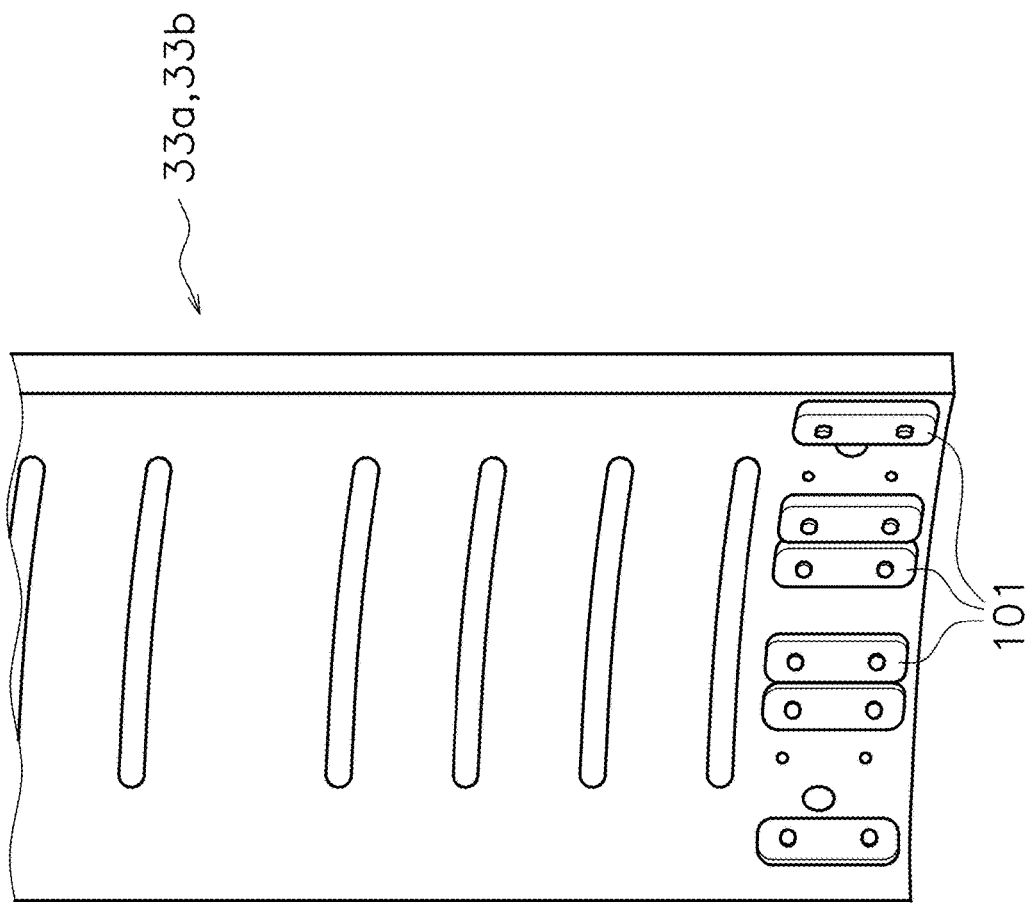
FIG. 36 is a perspective view of a first clamping portion or a second clamping portion according to a fifth preferred embodiment of the present invention.
Figure 37:
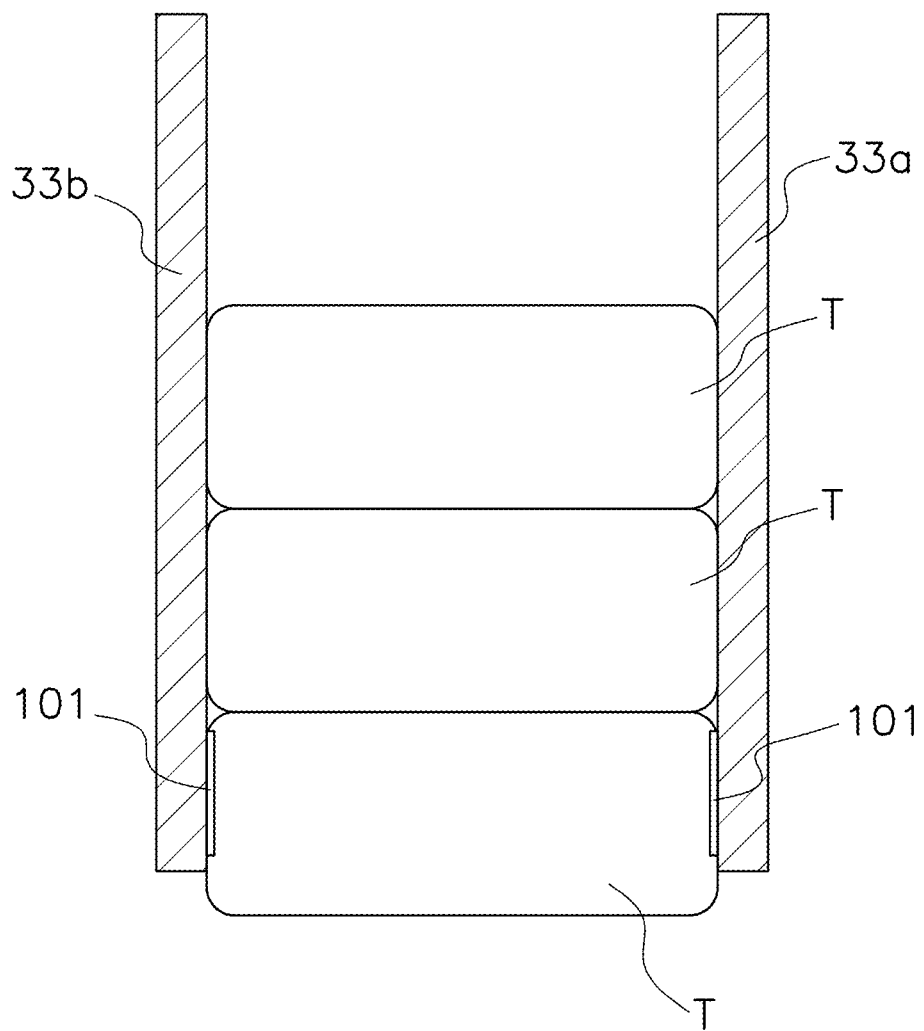
FIG. 37 is a sectional view of the first clamping portion or the second clamping portion according to the fifth preferred embodiment of the present invention.

Referring to FIG. 36 and FIG. 37, a fifth preferred embodiment of the present invention will be described. FIG. 36 is a perspective view of the first clamping portion or the second clamping portion in the fifth preferred embodiment. FIG. 37 is a sectional view of the first clamping portion or the second clamping portion in the fifth preferred embodiment.

On inner surfaces of lower portions of the first clamping portion 33a and the second clamping portion 33b, a plurality of convex portions 101 (one example of the convex portion) is arranged in a circumferential direction. The convex portion 101 is a detachable plane plate. The thicknesses of the lower portions of the first clamping portion 33a and the second clamping portion 33b are larger than other portions.

The convex portions 101 correspond to the height of the lowest tire T. Accordingly, when clamping the multiple tires T, upper tires T are clamped by plateless portions of the first clamping portion and the second clamping portion, and the lowest tire T is clamped strongly by the convex portions 101. Since the upper tires T are supported by the lowest tire T, they do not have to be clamped strongly by the first clamping portion and the second clamping portion.

As described above, when the first clamping portion 33a and the second clamping portion 33b clamp the tire T, it is possible to maintain enough force for clamping the lowest tire T.

In contrast, the lower portions of the first clamping portion and the second clamping portion are not guided, so it is difficult to maintain their verticality. Therefore, the clamping portion becomes inclined obliquely to the vertical direction, so it might be difficult to apply enough clamping force to the lower portion of the tires T from the first clamping portion and the second clamping portion.

Shapes, numbers, and positions of convex portions are not limited to the present preferred embodiment.

The preferred embodiments of the present invention can be described as follows.

The transporting system (the transporting system 1, the transporting system 1A, for example) includes a conveyor (the first conveyor 5), a control unit (the controller 71, for example), a first positioning unit (the first positioning device 13, the first positioning device 91, for example), a second positioning unit (the second positioning device 23, the second positioning device 81, for example), and a pair of clamping portions (the first clamping portion 33a and the second clamping portion 33b, for example).

The conveyor includes a transport surface to transport multiple kinds of circular articles (the tire T, for example) having different sizes, in a first direction.

The control unit controls the conveyor for transportation.

The first positioning unit is configured to position an end of an article that is transported by the conveyor, at a first predetermined position in the first direction.

The second positioning unit positions an end of the article in a second predetermined position in a second direction horizontally perpendicular or substantially perpendicular to the first direction.

The pair of clamping portions is provided at a clamping position (stacking position 61, for example) or near the clamping position. The clamping portions passes through between an article first portion (the tire first portion t1, for example) adjacent to an end of the article that has been determined by the first positioning unit and an article second portion (the tire second portion t2, for example) adjacent to an end of the article that has been determined by the second positioning unit to clamp side surfaces of the article.

In the transporting system, one end of the article is positioned at the first predetermined position in the first direction, and one end of the article is positioned at the second predetermined position in the second direction. A portion of the article between the article first portion and the article second portion is then clamped by the pair of clamping portions. Accordingly, articles having different outer diameter can be clamped accurately.

OTHER PREFERRED EMBODIMENTS

Multiple preferred embodiments of the present invention were explained above, but the present invention is not limited to these preferred embodiments, and various modifications are possible within a scope that does not depart from the gist of the present invention. In particular, the preferred embodiments and modified examples described in the present specification can be arbitrarily combined as needed.

Preferred embodiments of the present invention can apply to unstacking as well as stacking. For example, the unstacking can be performed while performing the positioning as in the stacking.

The second positioning device may position the second-direction position of an article by a non-contact method, instead of a stopper.

The first stopper may be located on the first conveyor extending obliquely to the second direction, and the second stopper may include side surfaces of the first conveyor, downstream of and adjacent to the first stopper. In this case, too, the clamping direction by the pair of clamping portions becomes oblique to the first direction.

The first stopper and the second stopper may have partial structures, which are located on the first conveyor at the same position in the first direction and spaced away from each other in the second direction. In this case, the tire first portion and the tire second portion are arranged in the second direction, so the clamping direction of the pair of clamping portions becomes the first direction.

Circular articles are not limited to tires.

The first positioning device and the second positioning device may be provided on the conveyor, and positioned adjacent to or in proximity to each other.

The second stopper does not need to escape.

The shifting unit may be a conveyor having an oblique transport direction or a pusher that pushes an article, other than the direction changing device.

The horizontal direction driving apparatus may be a self-travelling cart.

The clamping of the tires may be perceived or detected by detecting a torque of the clamping motor.

The pair of clamping portions may move simultaneously. In this case, since the tire is positioned on the first clamping portion 33a positioning side, the clamping is performed with the first clamping portion 33a as a reference. In addition, as long as the clamping is performed with the first clamping portion 33a as a reference, the second clamping portion 33b may start to move before the first clamping portion 33a moves. The first clamping portion 33a moves for a constant travelling distance.

The first stopper may move arbitrarily to the escape potion while the tire is clamped by the clamping portions.

A guide may be provided between the second positioning device 23 and the first positioning device 13, on a back side of the first conveyor 5 in the second direction. In this case, the tire T may spin and the portion of the tire T that has abutted against the second stopper 25 may not become the tire second portion t2 at the clamping position for example. However, in the second positioning device 23, the position of the tire second portion t2 of tire T in the second direction is the same as that in a preferred embodiment of the present invention.

Preferred embodiments of the present invention can be widely applied to transporting systems that transport multiple kinds of circular articles having different sizes.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transporting system comprising:
a conveyor including a transport surface to transport multiple kinds of circular articles with different sizes, in a first direction;
a controller to control the conveyor;
a first positioner to position an end of an article that is transported by the conveyor, at a first predetermined position in the first direction;
a second positioner to position an end of the article in a second predetermined position in a second direction horizontally perpendicular or substantially perpendicular to the first direction; and
a pair of clamping portions provided at a clamping position or adjacent to the clamping position and to pass through between an article first portion at or adjacent to an end of the article that has been positioned by the first positioner and an article second portion at or adjacent to an end of the article that has been positioned by the second positioner to clamp side surfaces of the article; wherein
the pair of clamping portions is capable of clamping the article in a direction inclined relative to the first direction.

2. The transporting system according to claim 1, wherein the pair of clamping portions is capable of clamping the article at a middle of a straight line connecting the article first portion and the article second portion, along a third direction horizontally perpendicular or substantially perpendicular to the straight line.

3. The transporting system according to claim 2, further comprising a shifter in the conveyor, upstream of the first positioner in a transport direction, to shift the article to one side in the second direction; wherein
the first positioner extends in the second direction;
the second positioner is on one side of the conveyor in the second direction to protrude from the transport surface of the conveyor in the vertical direction; and
the pair of clamping portions passes through between the article first portion and the article second portion to clamp the article in a direction at an angle of about 45 degrees relative to the first direction.

4. The transporting system according to claim 3, wherein the first positioner is movable between a first position where the first positioner projects above from the transport surface and a second position farther away from the article than the first position is, downstream in the transport direction or the first direction.

5. The transporting system according to claim 4, wherein the second positioner is movable between a third position where the second positioner can come into contact with the article in the second direction and a fourth position farther away from the article and the transport surface in the second direction than the third position is.

6. The transporting system according to claim 3, wherein the second positioner is movable between a third position where the second positioner can come into contact with the article in the second direction and a fourth position farther away from the article and the transport surface in the second direction than the third position is.

7. The transporting system according to claim 2, wherein the first positioner includes a first-direction position detector at or adjacent to the clamping position to contactlessly detect an end of the article in the first direction; wherein
the controller is configured or programmed to control the conveyor to stop transportation after the first-direction position detector detects the end of the article;
the second positioner positions an end of the article on a side of the conveyor in the second direction; and
the pair of clamping portions passes through the article first portion and the article second portion to clamp the article in a direction at an angle of about 45 degrees relative to the first direction.

8. The transporting system according to claim 7, wherein the second positioner includes:
a second-direction position detector to contactlessly detect a second-direction position of the article;
a second-direction adjustment conveyor to transport the article in the first direction and being movable in the second direction; and
a mover to, based on information from the second-direction position detector, move the second-direction adjustment conveyor in the second direction to position the article at a desired position in the second direction.

9. The transporting system according to claim 8, wherein the second-direction position detector includes an optical axis along the first direction;
the transporting system further comprises a detector mover to move the second-direction position detector between a detecting position and an escape position in the second direction; wherein
the escape position is farther away from the second-direction adjustment conveyor in the second direction than the detecting position is;
the detector mover locates the second-direction position detector in the escape position when the article is imported into and exported out from the second-direction adjustment conveyor, and locates the second-direction position detector in the detecting position when the article is positioned in the second direction in the second-direction adjustment conveyor; and
while the second-direction position detector is being positioned in the detecting position, the mover moves the second-direction adjustment conveyor toward the second-direction position detector, and if the second-direction position detector detects the article, the mover stops movement of the second-direction adjustment conveyor to position the article in the second direction.

10. The transporting system according to claim 9, further comprising an elevator including:
a pair of lower bodies located below in the vertical direction;
a pair of upper bodies located above in the vertical direction;
a pair of connectors connecting the pair of lower bodies and the pair of upper bodies, respectively, and the pair of clamping portions being connected to the pair of connectors, respectively; and
a driver to drive the pair of lower bodies or the pair of upper bodies such that the pair of clamping portions moves between the upper position and the lower position; wherein
the pair of lower bodies are located at a position higher than an upper surface of the highest article; and
the pair of clamping portions is located in the lower position such that lower ends of the pair of clamping portions are lower than the pair of lower bodies.

11. The transporting system according to claim 10, further comprising convex portions provided on inner surfaces of lower portions of the pair of clamping portions.

12. The transporting system according to claim 9, further comprising a clamping driver to move the pair of clamping portions in a clamping direction; wherein the controller is configured or programmed to control the clamping driver such that one of the pair of clamping portions moves to a position where the one is in contact with or adjacent to the article, and then the other of the pair of clamping portions pushes the article to clamp the article between the pair of clamping portions.

13. The transporting system according to claim 7, further comprising a clamping driver to move the pair of clamping portions in a clamping direction; wherein
    the controller is configured or programmed to control the clamping driver such that one of the pair of clamping portions moves to a position where the one is in contact with or adjacent to the article, and then the other of the pair of clamping portions pushes the article to clamp the article between the pair of clamping portions.

14. The transporting system according to claim 2, wherein the second positioner includes:
    a second-direction position detector to contactlessly detect a second-direction position of the article;
    a second-direction adjustment conveyor to transport the article in the first direction, and being movable in the second direction; and
    a mover to, based on information from the second-direction position detector, move the second-direction adjustment conveyor in the second direction to position the article at a desired position in the second direction.

15. The transporting system according to claim 14, wherein
    the second-direction position detector includes an optical axis along the first direction;
    the transporting system further comprises a detector mover to move the second-direction position detector between a detecting position and an escape position in the second direction;
    the escape position is farther away from the second-direction adjustment conveyor in the second direction than the detecting position is;
    the detector mover locates the second-direction position detector in the escape position when the article is imported into and exported out from the second-direction adjustment conveyor, and locates the second-direction position detector in the detecting position when the article is positioned in the second direction in the second-direction adjustment conveyor; and
    while the second-direction position detector is being positioned in the detecting position, the mover moves the second-direction adjustment conveyor toward the second-direction position detector, and if the second-direction position detector detects the article, the mover stops movement of the second-direction adjustment conveyor to position the article in the second direction.

16. The transporting system according to claim 15, further comprising a clamping driver to move the pair of clamping portions in a clamping direction; wherein
    the controller is configured or programmed to control the clamping driver such that one of the pair of clamping portions moves to a position where the one is in contact with or adjacent to the article, and then the other of the pair of clamping portions pushes the article to clamp the article between the pair of clamping portions.

17. A transporting system comprising:
    a conveyor including a transport surface to transport multiple kinds of circular articles with different sizes, in a first direction;
    a controller to control the conveyor;
    a first positioner to position an end of an article that is transported by the conveyor, at a first predetermined position in the first direction;
    a second positioner to position an end of the article in a second predetermined position in a second direction horizontally perpendicular or substantially perpendicular to the first direction; and
    a pair of clamping portions provided at a clamping position or adjacent to the clamping position and to pass through between an article first portion at or adjacent to an end of the article that has been positioned by the first positioner and an article second portion at or adjacent to an end of the article that has been positioned by the second positioner to clamp side surfaces of the article; wherein
    the second positioner includes:
        a second-direction position detector to contactlessly detect a second-direction position of the article;
        a second-direction adjustment conveyor to transport the article in the first direction, and being movable in the second direction; and
        a mover to, based on information from the second-direction position detector, move the second-direction adjustment conveyor in the second direction to position the article at a desired position in the second direction.

18. The transporting system according to claim 17, wherein
    the second-direction position detector includes an optical axis along the first direction;
    the transporting system further comprises a detector mover to move the second-direction position detector between a detecting position and an escape position in the second direction; wherein
    the escape position is farther away from the second-direction adjustment conveyor in the second direction than the detecting position is;
    the detector mover locates the second-direction position detector in the escape position when the article is imported into and exported out from the second-direction adjustment conveyor, and locates the second-direction position detector in the detecting position when the article is positioned in the second direction in the second-direction adjustment conveyor; and
    while the second-direction position detector is being positioned in the detecting position, the mover moves the second-direction adjustment conveyor toward the second-direction position detector, and if the second-direction position detector detects the article, the mover stops movement of the second-direction adjustment conveyor to position the article in the second direction.

19. The transporting system according to claim 18, further comprising a clamping driver to move the pair of clamping portions in a clamping direction; wherein
    the controller is configured or programmed to control the clamping driver such that one of the pair of clamping portions moves to a position where the one is in contact with or adjacent to the article, and then the other of the pair of clamping portions pushes the article to clamp the article between the pair of clamping portions.

20. A transporting system comprising:
    a conveyor including a transport surface to transport multiple kinds of circular articles with different sizes, in a first direction;

a controller to control the conveyor;

a first positioner to position an end of an article that is transported by the conveyor, at a first predetermined position in the first direction;

a second positioner to position an end of the article in a second predetermined position in a second direction horizontally perpendicular or substantially perpendicular to the first direction;

a pair of clamping portions provided at a clamping position or adjacent to the clamping position and to pass through between an article first portion at or adjacent to an end of the article that has been positioned by the first positioner and an article second portion at or adjacent to an end of the article that has been positioned by the second positioner to clamp side surfaces of the article; and an elevator including:
- a pair of lower bodies located below in the vertical direction;
- a pair of upper bodies located above in the vertical direction;
- a pair of connectors connecting the pair of lower bodies and the pair of upper bodies, respectively, and the pair of clamping portions being connected to the pair of connectors, respectively; and
- a driver to drive the pair of lower bodies or the pair of upper bodies such that the pair of clamping portions moves between the upper position and the lower position; wherein the pair of lower bodies are located at a position higher than an upper surface of the highest article; and the pair of clamping portions is located in the lower position such that lower ends of the pair of clamping portions are lower than the pair of lower bodies.

21. The transporting system according to claim 20, further comprising convex portions provided on inner surfaces of lower portions of the pair of clamping portions.

22. The transporting system according to claim 21, further comprising a detector to detector a height of the article; wherein the controller is configured or programmed to control driving amounts of the driver based on the height of the article detected by the detector.

23. A transporting system comprising:

a conveyor including a transport surface to transport multiple kinds of circular articles with different sizes, in a first direction;

a controller to control the conveyor;

a first positioner to position an end of an article that is transported by the conveyor, at a first predetermined position in the first direction;

a second positioner to position an end of the article in a second predetermined position in a second direction horizontally perpendicular or substantially perpendicular to the first direction;

a pair of clamping portions provided at a clamping position or adjacent to the clamping position and to pass through between an article first portion at or adjacent to an end of the article that has been positioned by the first positioner and an article second portion at or adjacent to an end of the article that has been positioned by the second positioner to clamp side surfaces of the article; and a clamping driver to move the pair of clamping portions in a clamping direction; wherein the controller is configured or programmed to control the clamping driver such that one of the pair of clamping portions moves to a position where the one is in contact with or adjacent to the article, and then the other of the pair of clamping portions pushes the article to clamp the article between the pair of clamping portions.

\* \* \* \* \*